(12) United States Patent
Ludwig

(10) Patent No.: US 10,139,032 B2
(45) Date of Patent: Nov. 27, 2018

(54) THREAD PROTECTOR

(71) Applicant: Texas International Oilfield Tools, Ltd., Houston, TX (US)

(72) Inventor: Darcy Ludwig, Red Deer (CA)

(73) Assignee: Texas International Oilfield Tools, Ltd., Houston, TX (US)

( * ) Notice: Subject to any disclaimer, the term of this patent is extended or adjusted under 35 U.S.C. 154(b) by 0 days.

(21) Appl. No.: 15/658,359

(22) Filed: Jul. 24, 2017

(65) Prior Publication Data
US 2018/0023749 A1    Jan. 25, 2018

Related U.S. Application Data

(60) Provisional application No. 62/365,876, filed on Jul. 22, 2016.

(51) Int. Cl.
B65D 59/06 (2006.01)
F16L 57/00 (2006.01)
F16L 15/00 (2006.01)

(52) U.S. Cl.
CPC .......... *F16L 57/005* (2013.01); *F16L 15/006* (2013.01)

(58) Field of Classification Search
CPC . F16L 57/005; B65D 41/0428; B65D 41/002; B65D 41/005; B65D 41/0407
USPC ....... 138/96 R, 96 T, 89; 220/796, 506, 233, 220/235
See application file for complete search history.

(56) References Cited

U.S. PATENT DOCUMENTS

| | | | | |
|---|---|---|---|---|
| 1,708,657 A | * | 4/1929 | Brown | B65D 59/02 102/528 |
| 1,711,181 A | * | 4/1929 | Shrum | B65D 59/06 138/96 T |
| 2,082,286 A | * | 6/1937 | Gunderman | B65D 59/06 138/96 T |

(Continued)

FOREIGN PATENT DOCUMENTS

| | | |
|---|---|---|
| CA | 2974057 | 1/2018 |
| WO | 2004063025 | 7/2004 |

OTHER PUBLICATIONS

PCT/US2017/043567—Counterpart PCT International Search Report (dated Oct. 16, 2017) 3 pages.

(Continued)

*Primary Examiner* — Patrick F Brinson
(74) *Attorney, Agent, or Firm* — Gordon G. Waggett, P.C.

(57) ABSTRACT

This tubular member thread protector generally comprises an outer member capable of rotation in a first direction about an axis and an inner member coaxially integrated within the first member and capable of rotation in an opposite direction. The inner member comprises a flexible annular sleeve having an outer surface and an interior surface defining an interior annular space capable of receiving the tubular threaded end. One or more camming surfaces are disposed about the inner sleeve outer surface. The outer member comprises a generally annular structure having a closed end, an open end, an outer surface and an inner surface. One or more raised camming members are disposed about the outer member inner surface and are aligned with sleeve camming members during rotation, the outer member camming members press against the inner sleeve camming members to radially compress the sleeve inner surface against the threaded member.

19 Claims, 35 Drawing Sheets

(56) References Cited

U.S. PATENT DOCUMENTS

| | | | | |
|---|---|---|---|---|
| 3,923,192 | A | * 12/1975 | Walters | B65D 39/082 |
| | | | | 220/235 |
| 4,394,916 | A | 7/1983 | Smalley | |
| 4,655,256 | A | * 4/1987 | Lasota | B65D 59/02 |
| | | | | 138/96 T |
| 5,197,616 | A | 3/1993 | Buono | |
| 6,367,508 | B1 | * 4/2002 | Richards | B65D 59/02 |
| | | | | 138/96 R |
| 2014/0261849 | A1 | 9/2014 | Danneffel et al. | |
| 2015/0344193 | A1 | 12/2015 | Piscopo | |

OTHER PUBLICATIONS

PCT/US2017/043567—Counterpart PCT Written Opinion (dated Oct. 16, 2017) 3 pages.

\* cited by examiner

UNLOCKED POSITION
SECTION A-A

LOCKED POSITION
SECTION B-B

SECTION C-C

SECTION D-D

SECTION E-E

SECTION K-K

SECTION M-M

SECTION H-H

SECTION G-G

THREAD PROTECTOR

CROSS-REFERENCE TO RELATED APPLICATIONS

This application claims the benefit of the filing date of and priority to: U.S. Provisional Application Ser. No. 62/365,876 entitled "Thread Protector" and filed Jul. 22, 2016, Confirmation No. 9823; said provisional application is incorporated by reference herein in its entirety for all purposes.

STATEMENT REGARDING FEDERALLY SPONSORED RESEARCH OR DEVELOPMENT

Not Applicable.

FIELD OF THE INVENTION

The field of present invention relates generally to devices for protecting the threaded ends of elements such as pipes or tubular members and, more particularly, to an improved device of this kind that is of simpler design, weather resistant, and quicker to mount onto, and unmount off of, such tubular member's threaded ends.

BACKGROUND OF THE INVENTION

The background information discussed below is presented to better illustrate the novelty and usefulness of the present invention. This background information is not admitted prior art.

Oil and gas well drilling operations typically uses a plurality of connected, jointed drill pipes with a drill bit attached at one end. Drill pipe, drillpipe or drillstem comes in a variety of sizes, strengths, and weights but are typically 30 to 33 feet in length. Drill pipe is comprised of tubular steel conduit fitted with special threaded ends called tool joints. These threaded ends may be externally or internally threaded. Similarly, tubular members such as drill casing also have internally and externally threaded ends. Both types of threaded ends must be protected from damage, deformations, and soiling.

During oil and gas well drilling operations, tubular members are often exposed to rough manipulation and storage conditions. Tubular members are often stored in wet and dirty conditions. Tubular members are usually manipulated using hydraulic pipe moving apparatus, where a carriage or skate imparts significant forces onto a tubular member's threaded end, so as to move that tubular member along a trough to a desired location.

Conventional thread protectors normally comprise a clamp-on mechanism or a lock-pin mechanism to secure the thread protector onto the tubular member's threaded end. These clamp-on and lock-pin mechanisms employ stainless steel or other metallic springs, clamps and pins. While convenient in terms of securing or removing a thread protector onto or off of a threaded end, the metallic and steel components of these conventional mechanisms are often damaged during use. Such damage is usually due to exposure to the elements and/or due to the forces and vibrations from the carriage or skate of a hydraulic pipe moving apparatus.

Therefore, what is needed is a simple, cost-effective thread protector that is weather resistant, simple in design and does not require steel or other metallic components to lock or unlock the protector onto, or off of, a threaded end.

BRIEF SUMMARY OF THE INVENTION

In one embodiment, there is described a thread protector for protecting the outside threaded end of a tubular member. This thread protector generally comprises coaxially aligned outer and inner members. In one embodiment, the outer member is capable of rotating in a first direction about an axis and comprises a first housing having a substantially closed top end, an open bottom end, an outer side wall structure extending about the axis between the top end and the bottom end, an outer surface defined by a side wall surface and an outer top end surface, an inner side wall surface, an inner top end surface, and an interior space defined by the open bottom end, the inner side wall surface and the inner top end surface. One or more outer member lugs are disposed on the inner side wall surface of the outer member, each lug having an outer member lug entrance oriented in the first direction of rotation, an outer member lug slope, and an outer member lug slope exit opposite the lug entrance, the slope generally increasing between the lug entrance and the lug exit. The outer member further comprises one or more outer member retaining shoulders axially disposed about a circumference of the inner side wall surface and extending inwardly toward the axis.

The thread protector further comprises an inner member capable of coaxially nesting within the outer member and capable of rotating in a second direction opposite the first direction about the axis. In one embodiment, the inner member comprises a second housing having a substantially annular wall structure disposed about the axis having top and bottom opposed open ends, a flexible outer annular wall surface, an inner annular wall surface of a desired inner diameter capable of receiving the tubular member threaded end, and an inner member inner space defined by the opposed open ends and the inner wall surface. One or more inner member lugs are disposed on the outer wall surface of the inner member, each inner member lug having an inner member lug leading edge oriented in the second direction of rotation, an inner member lug slope, and an inner member lug slope exit opposite the lug leading edge, the slope generally increasing between the lug leading edge and the inner member lug slope exit. The inner member further comprises one or more inner retaining shoulders axially disposed about a circumference of the inner member outer surface for interfacing with the one or more outer member retaining shoulders to retain the nested rotatable inner member within the outer member.

In operation, the inner member lugs and outer member lugs are disposed on their respective inner member outer surface or outer member inner surface so that when the inner member is nested within the outer member and the outer member is rotated in its first direction relative to the inner member or the inner member is rotated in its second direction relative to the outer member, one or more of the respective one or more outer lugs will engage with a corresponding one or more of the respective one or more inner lugs to urge the outer annular wall structure of the inner member to be compressed toward the axis thereby radially inwardly compressing the inner annular wall surface of the inner member towards the axis to engage with the tubular member threaded end when such threaded end is received within the inner member inner annular space.

The thread protector may further comprise an indent in the outer top surface extending inwardly about the axis into the interior space of the outer member, and into the inner space of the nested inner member. This indent may also further comprise one or more air or vent holes.

The thread protector may further comprise one or more grips or gripping surfaces on the outer surface.

The thread protector's one or more retaining shoulders may comprise a single shoulder extending about a portion of the circumference, or comprise a single shoulder extending about the entirety of the circumference. The one or more retaining shoulders may comprise a plurality of shoulder segments spaced-apart about the circumference.

In another embodiment of the thread protector, the outer member may further comprise one or more locking wedges protruding inwardly from the inner side wall surface of the outer member, each of the one or more locking wedges comprising a wedge ramp entrance oriented in the first direction of rotation, a wedge sloped section, a wedge apex, and a wedge ramp exit; and wherein the inner member further comprises one or more corresponding locking wedge receiving ramps protruding outwardly from the outer annular wall surface of the inner member for engaging with a corresponding locking wedge, each of the one or more locking wedge receiving ramps comprising an entrance oriented in the second direction of rotation, one or more detents for receiving one or more of the corresponding wedge apexes, and a receiving ramp exit.

In one embodiment, the one or more inner member lugs are evenly spaced apart about the circumference of the inner side wall surface of the outer member in one or more rows, and the one or more outer member lugs are correspondingly evenly spaced apart on the outer wall surface of the inner member.

In another embodiment, the one or more inner member lugs comprise a plurality of evenly spaced-apart inner member lugs disposed about the circumference of the inner member outer annular wall surface, and the one or more outer member lugs comprise a plurality of evenly spaced-apart outer member lugs correspondingly disposed about the circumference of the outer member inner side wall surface. In another embodiment, the inner member lugs are spaced apart in a single circumferential row on the inner member outer annular wall surface, and wherein the outer member lugs are correspondingly spaced apart in a single circumferential row on the outer member inner side wall surface. In yet another embodiment, the inner member lugs are spaced apart in one or more single circumferential rows on the inner member outer annular wall surface, and wherein the outer member lugs are correspondingly spaced apart in one or more circumferential rows on the outer member inner side wall surface.

The inner member lugs may further comprise a recessed area on the lug slope for receiving a corresponding outer member lug.

In one embodiment, the outer member side wall surface forms a generally cylindrical structure and wherein the inner member inner annular surface forms a generally cylindrical structure having the desired inner diameter. The inside annular wall surface may contain surface gripping ridges or the like for frictional engagement with the tubular member threaded end.

In one embodiment, the flexible outer annular wall surface of the inner member generally comprises a uniform wall thickness, and in other embodiments, it generally comprises a nonuniform wall thickness. To enhance the flexibility of the annular wall surface of the inner member, the flexible outer annular wall surface may contain one or more channels to create zones of thinner wall thickness to increase the flexibility of the annular wall surface.

Another embodiment describes a thread protector having first and second ends for protecting the threaded end of a tubular member. This embodiment also includes an outer member capable of rotating in a first direction about an axis comprising a substantially annular member disposed about the axis having first and second outer member ends, an outer member outer surface, and an outer member inner surface defining an outer member internal annular space, and one or more raised camming members disposed about the axis on the outer member inner surface. This embodiment further includes an inner annular flexible sleeve coaxially and rotationally nested within the outer member annular member and capable of rotating in a second direction opposite the first direction about the axis comprising an outer sleeve surface, an inner sleeve surface and opposed first and second sleeve end openings defining a sleeve inner annular space of a desired internal diameter capable of receiving a tubular member threaded end of a desired diameter, and one or more sleeve raised camming members disposed about the axis on the sleeve outer sleeve surface. An end cap is also provided capable of covering one end of the coaxially nested inner sleeve and outer member. Similar to other embodiments, in operation, the raised sleeve camming members and the raised outer member camming members are disposed on their respective sleeve outer surface or outer member inner surface so that when the inner sleeve is nested within the outer member and the outer member is rotated in its first direction relative to the inner sleeve or the inner sleeve is rotated in its second direction relative to the outer member, one or more of the respective one or more outer member camming members will engage with a corresponding one or more of the respective one or more sleeve camming members to urge the sleeve outer surface to be compressed toward the axis thereby radially inwardly compressing the sleeve inner surface inwardly toward the axis to engage with the tubular member threaded end when such threaded end has been received within the sleeve inner annular space.

BRIEF DESCRIPTION OF THE SEVERAL VIEWS OF THE DRAWINGS

Referring to the drawings, several aspects of the present invention are illustrated by way of example, and not by way of limitation, in detail in the figures, wherein.

DETAILED DESCRIPTION OF THE INVENTION

Figure 1:
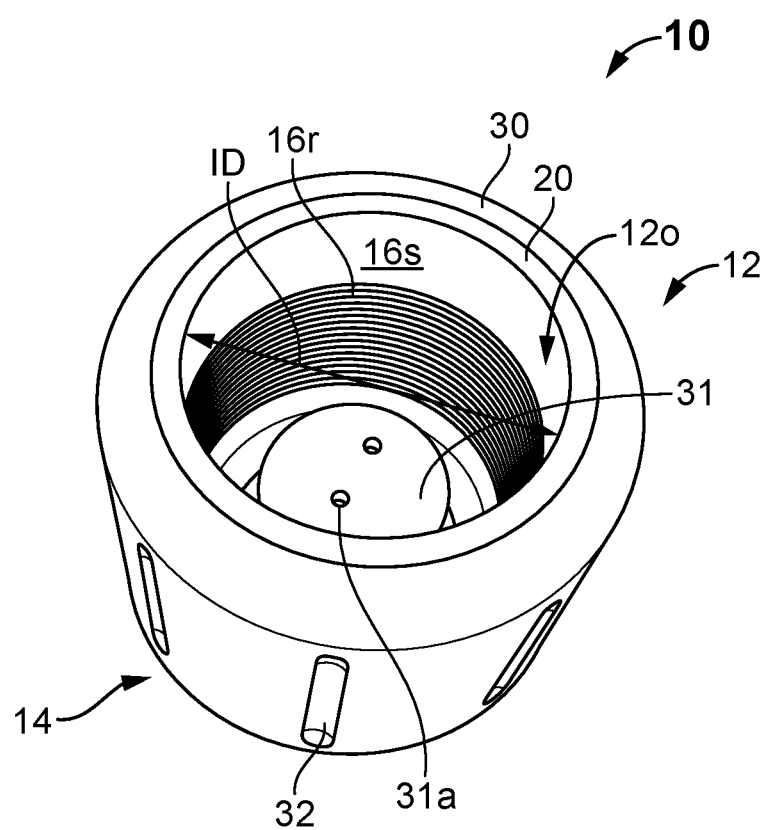
FIG. 1 is a bottom end perspective view of a first embodiment of the thread protector of the present invention.
Figure 2:
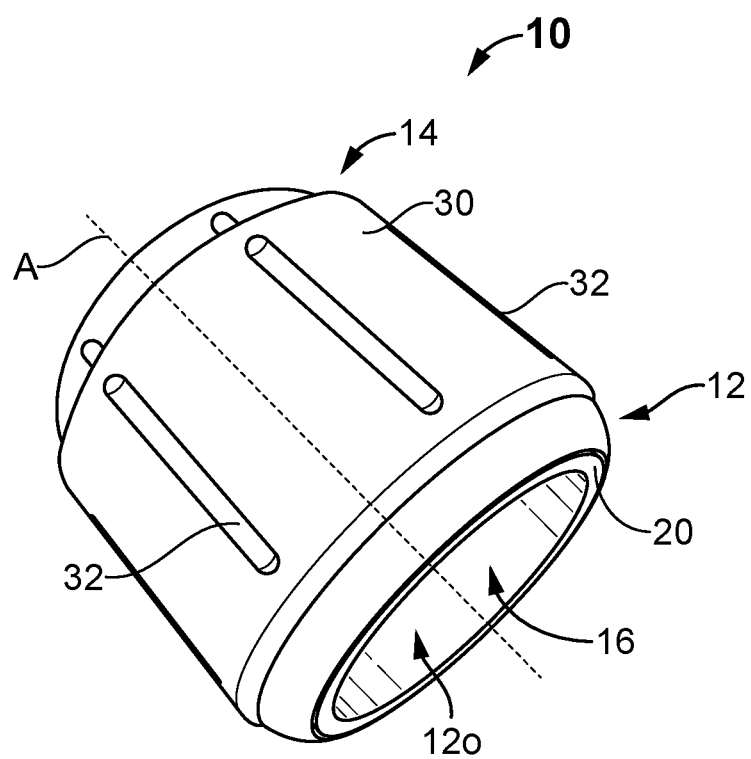
FIG. 2 is a bottom end side perspective view of the thread protector of the embodiment of FIG. 1.
Figure 3:
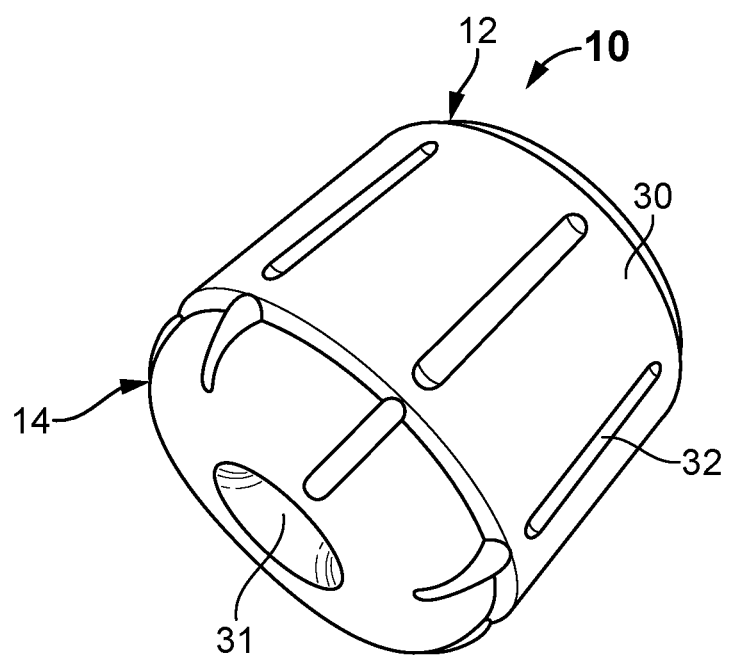
FIG. 3 is a top end side perspective view of the thread protector of the embodiment of FIG. 1.
Figure 4:
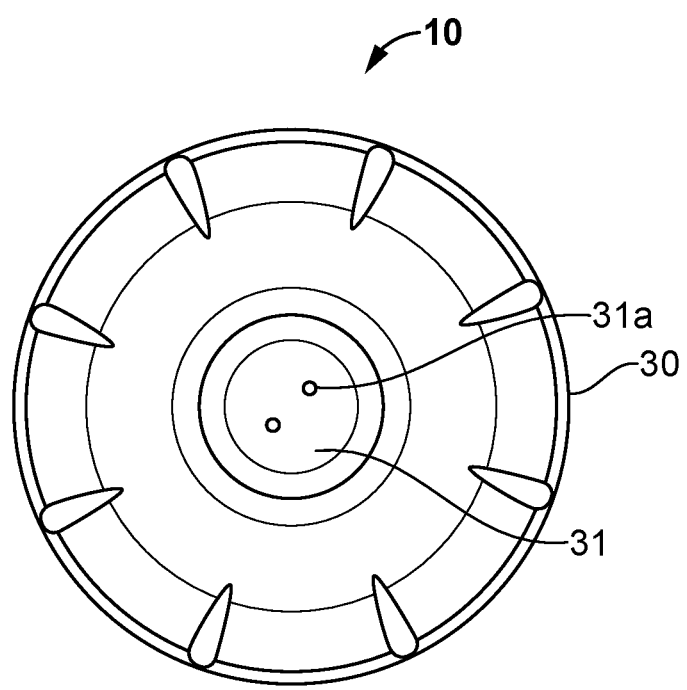
FIG. 4 is a top end view of the thread protector of the embodiment of FIG. 1.
Figure 5:
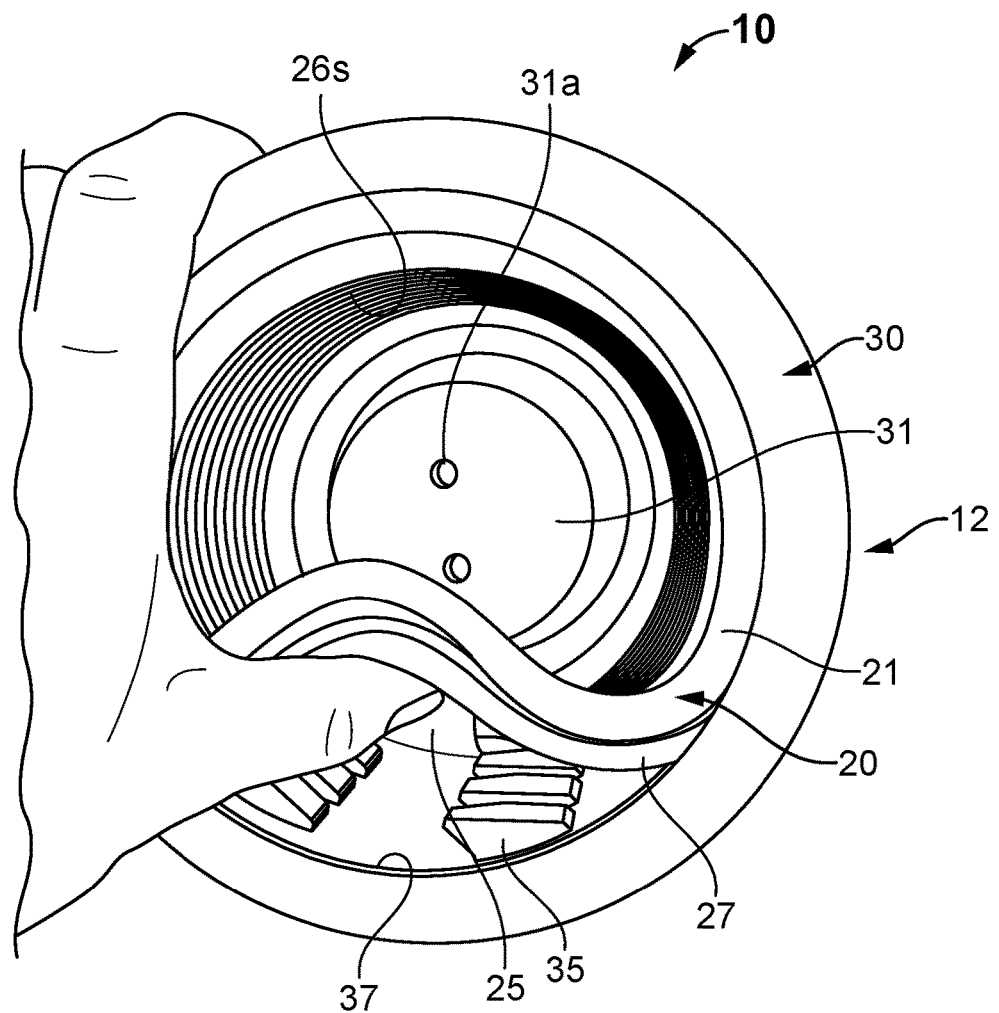
FIG. 5 is a bottom end perspective view of the thread protector of the embodiment of FIG. 1, showing the inner member being pulled away to reveal the interior structure of the outer member.
Figure 6:
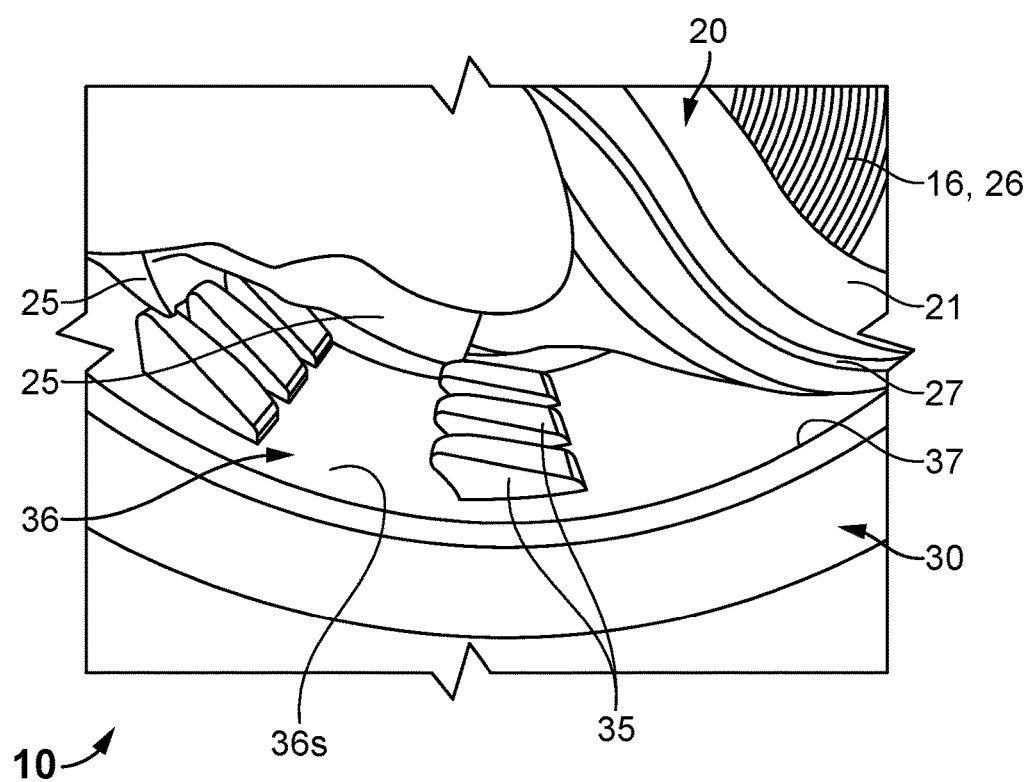
FIG. 6 is an enlarged view of the thread protector of the embodiment of FIG. 5, showing the inner member being pulled away to reveal the interior structure of the outer member.
Figure 7:
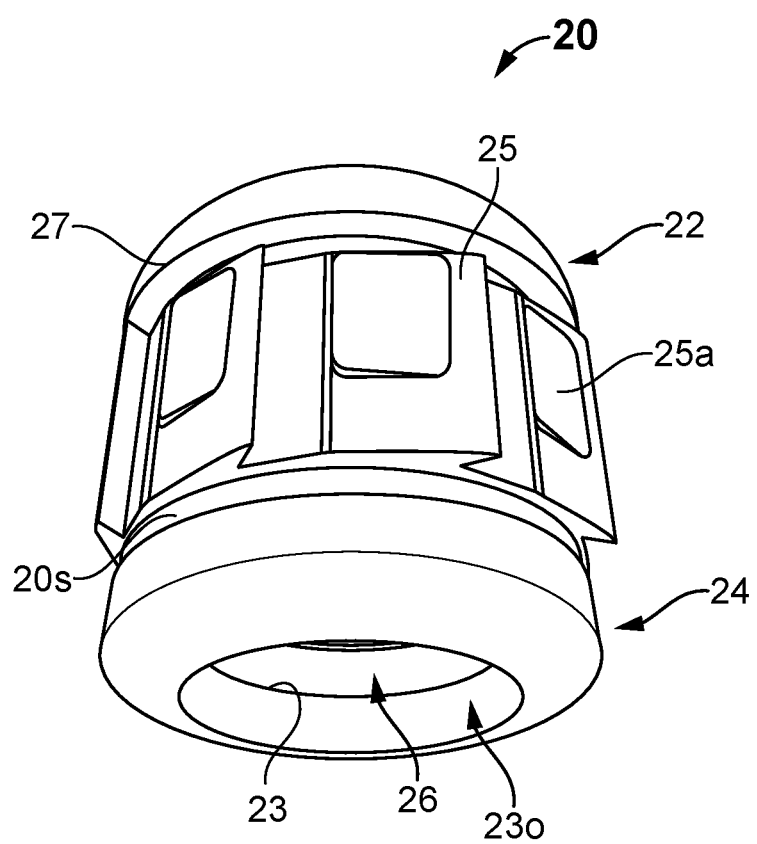
FIG. 7 is a top end side perspective view of the inner member of the thread protector of the embodiment of FIG. 1.
Figure 8:
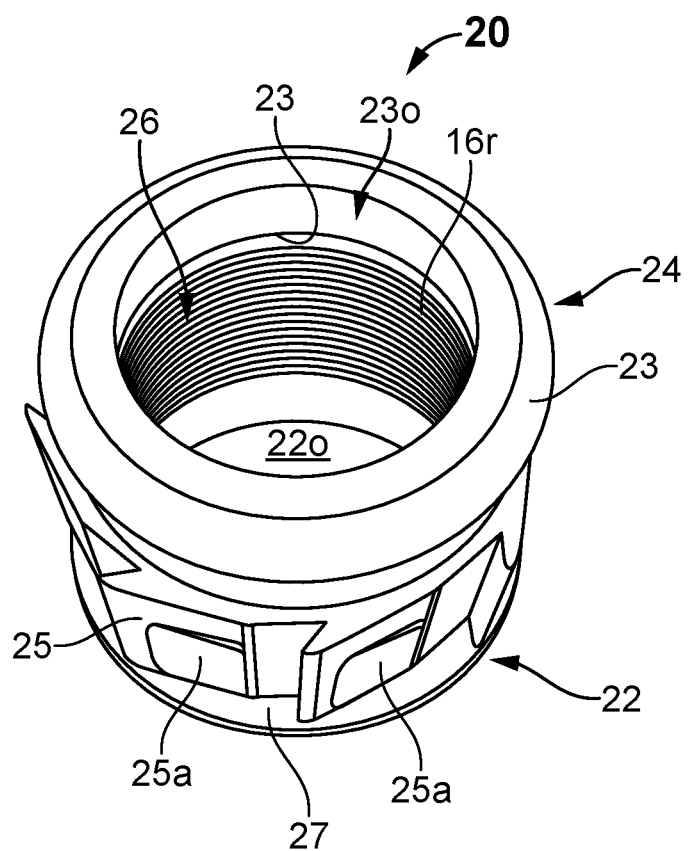
FIG. 8 is a top end perspective view of the inner member of the thread protector of the embodiment of FIG. 1.

The following description is of preferred embodiments by way of example only and without limitation to the combination of features necessary for carrying the invention into effect. Reference is to be had to the Figures in which identical reference numbers identify similar components. The drawing figures are not necessarily to scale (except where specifically indicated) and certain features may be shown in schematic or diagrammatic form in the interest of clarity and conciseness.

FIGS. 1-10 shows a first preferred embodiment of a thread protector 10 suitable for mounting onto, and off of, a threaded end TR of a tubular member T having an outside diameter OD. For tubular members such as casing string, specification 5C3 of the American Petroleum Institute (API) standardizes a number of casing sizes ranging from 4.5 inches (11.43 cm) to 20 inches (50.80 cm) outside diameter OD. The threaded end TR of such a casing string tubular T will usually also feature a slight conical shape or taper to a slightly smaller diameter than the outside OD diameter of the tubular member T.

Figure 9:
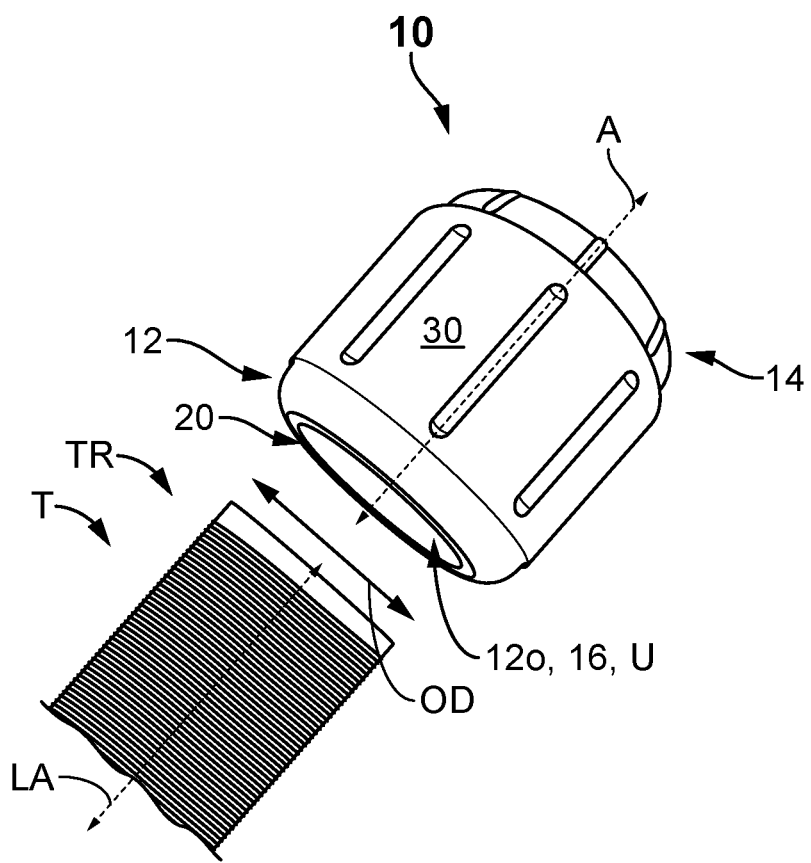
FIG. 9 is a perspective side view of the thread protector of the embodiment of FIG. 1, shown adjacent a threaded end of a tubular member.
Figure 10:
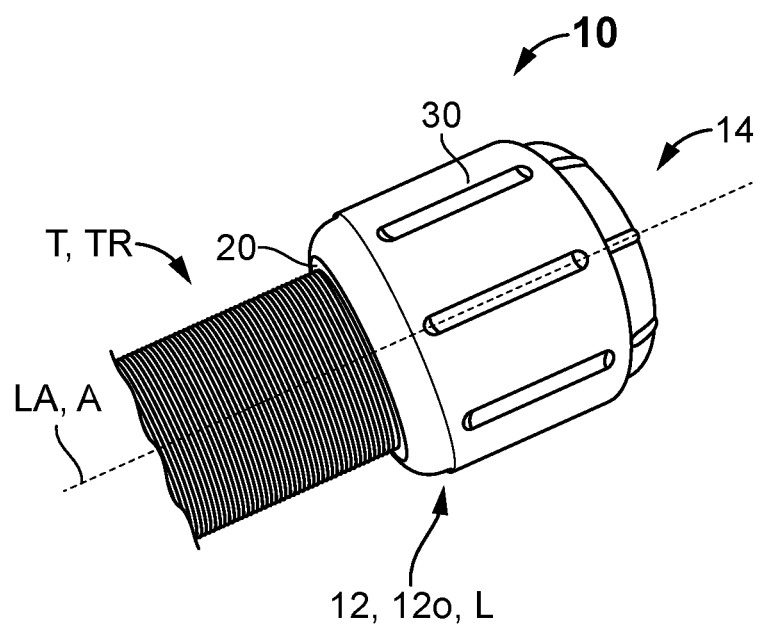
FIG. 10 is a perspective side view of the thread protector of the embodiment of FIG. 1, shown mounted on a threaded end of a tubular member.
Figure 11A:
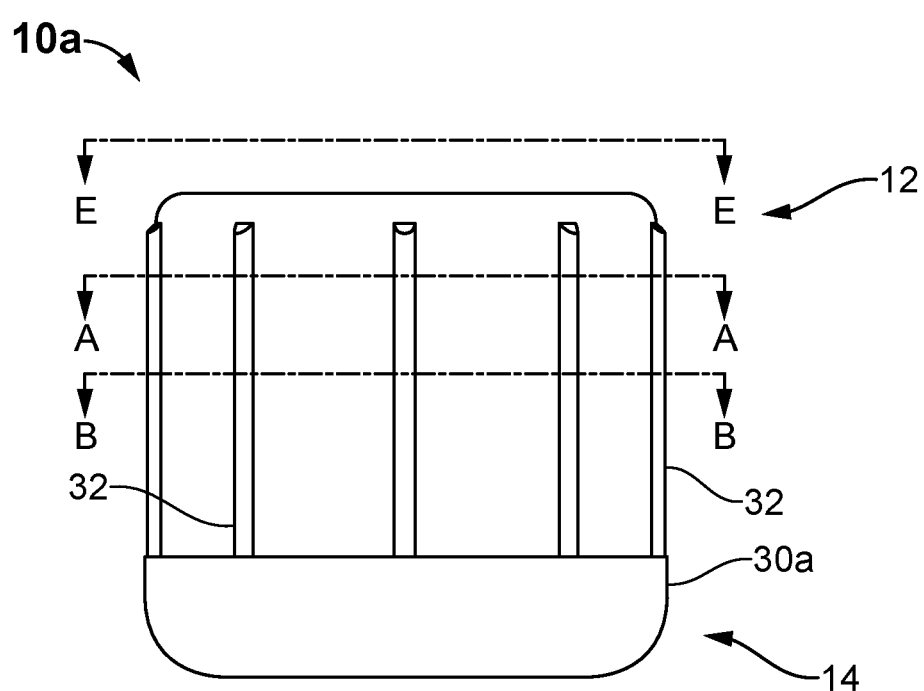
FIG. 11A is a side view of a second embodiment of the thread protector of the present invention.
Figure 11B:
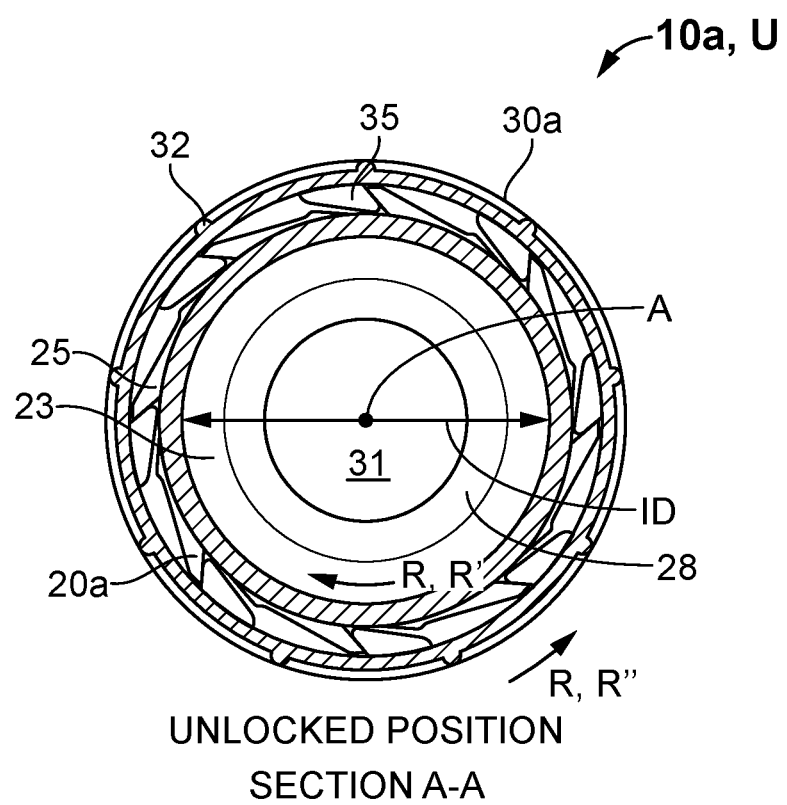
FIG. 11B is a sectioned bottom end view of the second embodiment of the thread protector of FIG. 11A, shown in an unlocked position, taken along A-A of FIG. 11A.

The thread protector 10 is preferably a generally hollow cylindrical member, or a generally annular sleeve-like member, having a first, or bottom side end 12, a second, or top side end 14 and an interior 16 adapted to accept and surround at least part of a threaded end TR of a tubular member; as illustrated in FIGS. 9 and 10. The thread protector (FIG. 11A) may be actuated, positioned, rotated R or moved between a locked L and an unlocked U configuration (see FIG. 11B unlocked position, and FIG. 12 locked position).

When in the unlocked configuration U, the first end 12 comprises an opening 12o to accept tubular threaded end TR therethrough and into the interior 16. Preferably, opening 12o and interior 16 have a generally circular cross-section and an inside diameter ID to substantially match the outside diameter OD of the tubular member (see FIGS. 9, 10 and 11B). More preferably, opening 12o and interior 16 are of such size and dimensions to slidably and snuggly accept the threaded end TR, when in the unlocked configuration U.

Figure 12:
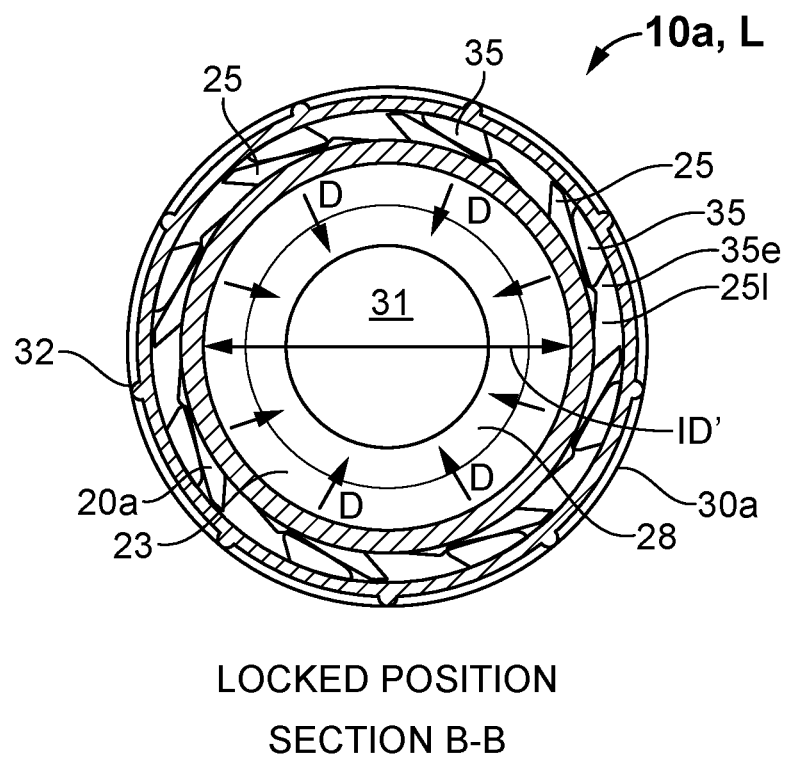
FIG. 12 is a sectioned bottom end view of the second embodiment of the thread protector of FIG. 11A, shown in a locked position, taken along B-B of FIG. 11A.
Figure 13:
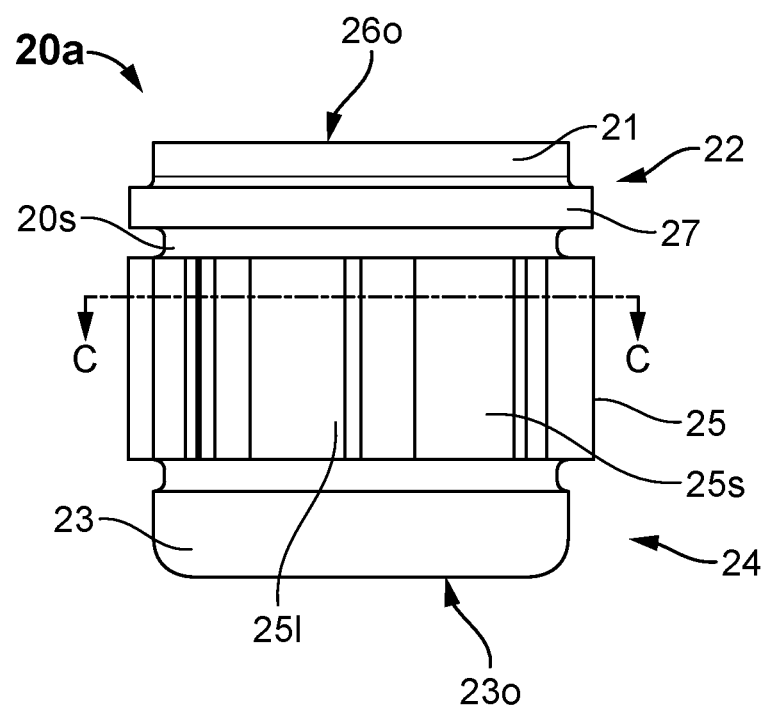
FIG. 13 is a side view of the inner member of the thread protector of the embodiment of FIG. 11A.
Figure 14:
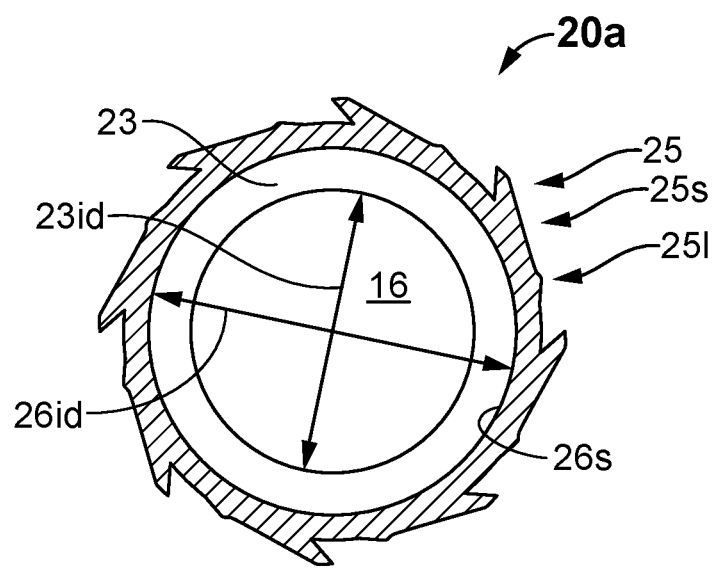
FIG. 14 is a sectioned view of the inner member of FIG. 13 taken along line C-C.
Figure 15:
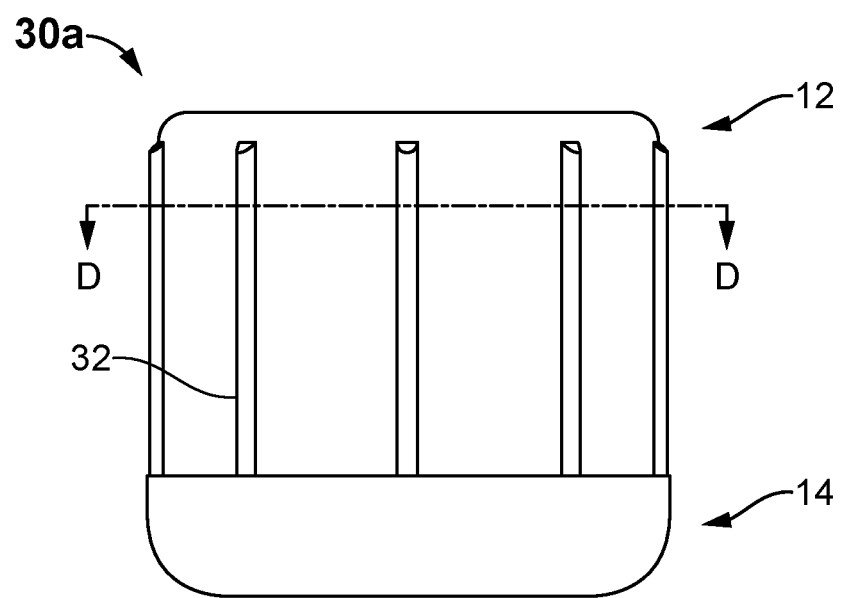
FIG. 15 is a side view of the outer member of the thread protector of the embodiment of FIG. 11A.
Figure 16:
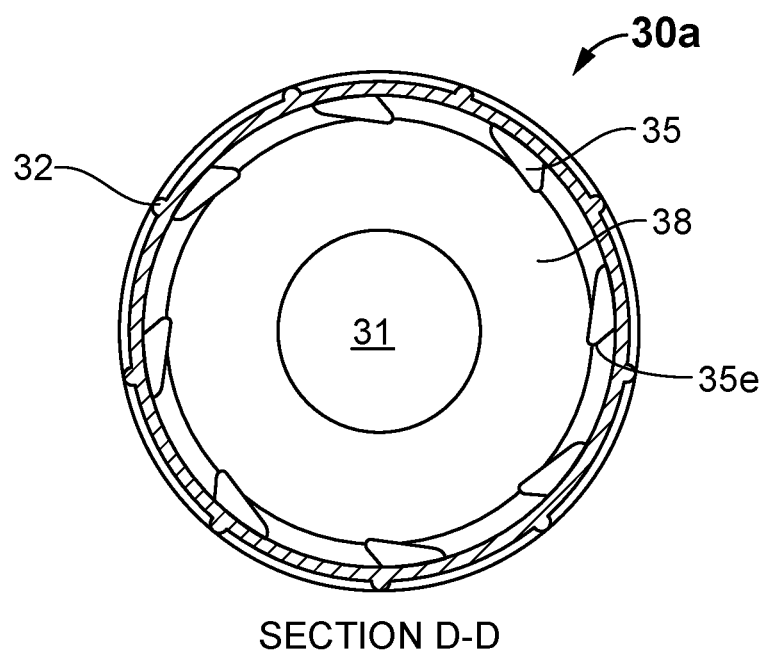
FIG. 16 is a sectioned view of the outer member of FIG. 15 taken along line D-D.
Figure 17:
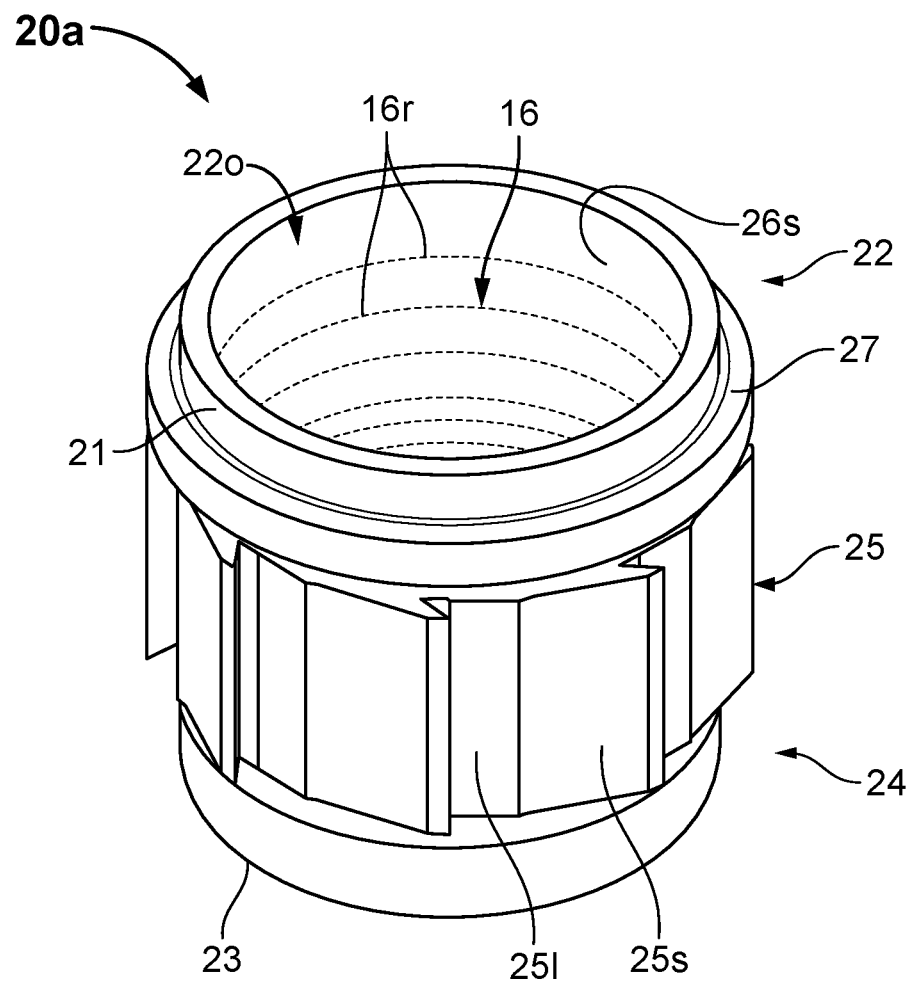
FIG. 17 is a bottom end perspective view of the inner member of the thread protector of the embodiment of FIG. 11A.
Figure 18:
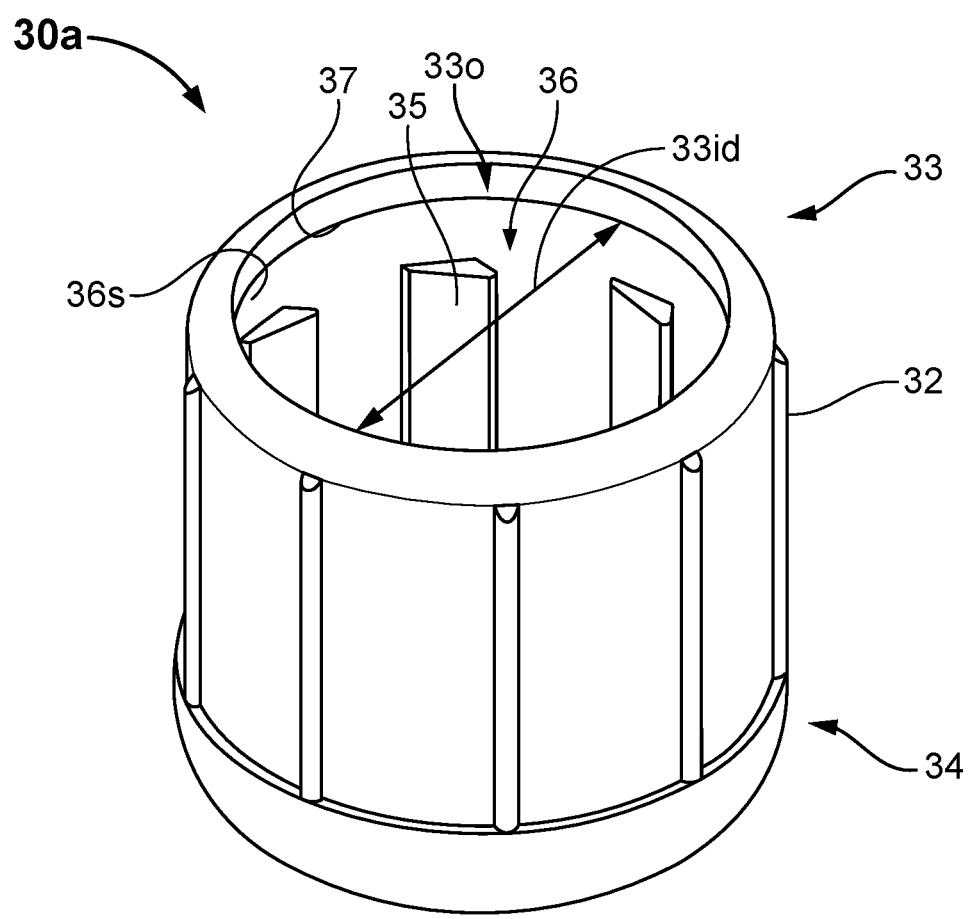
FIG. 18 is a bottom end perspective view of the outer member of the thread protector of the embodiment of FIG. 11A.
Figure 19:
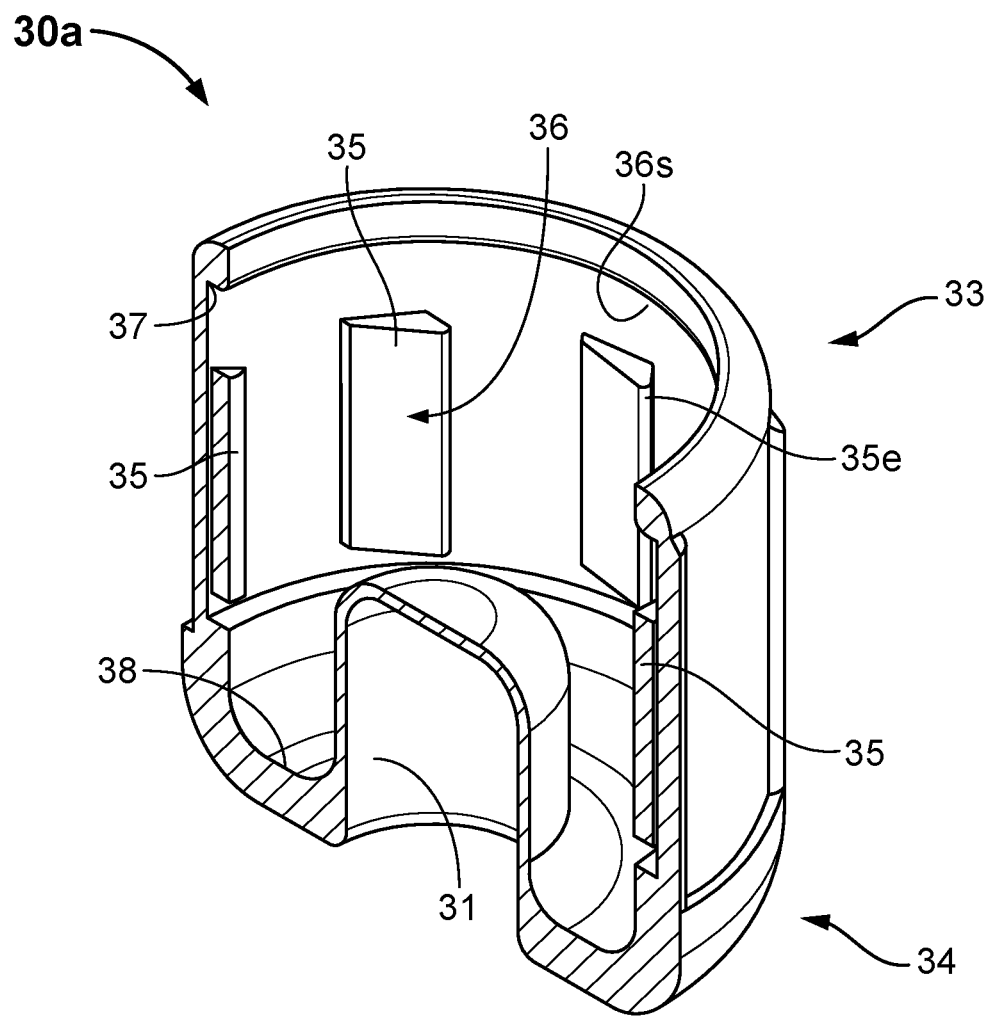
FIG. 19 is a sectioned perspective view of the outer member of the thread protector of the embodiment of FIG. 11A taken from FIG. 18.
Figure 20:
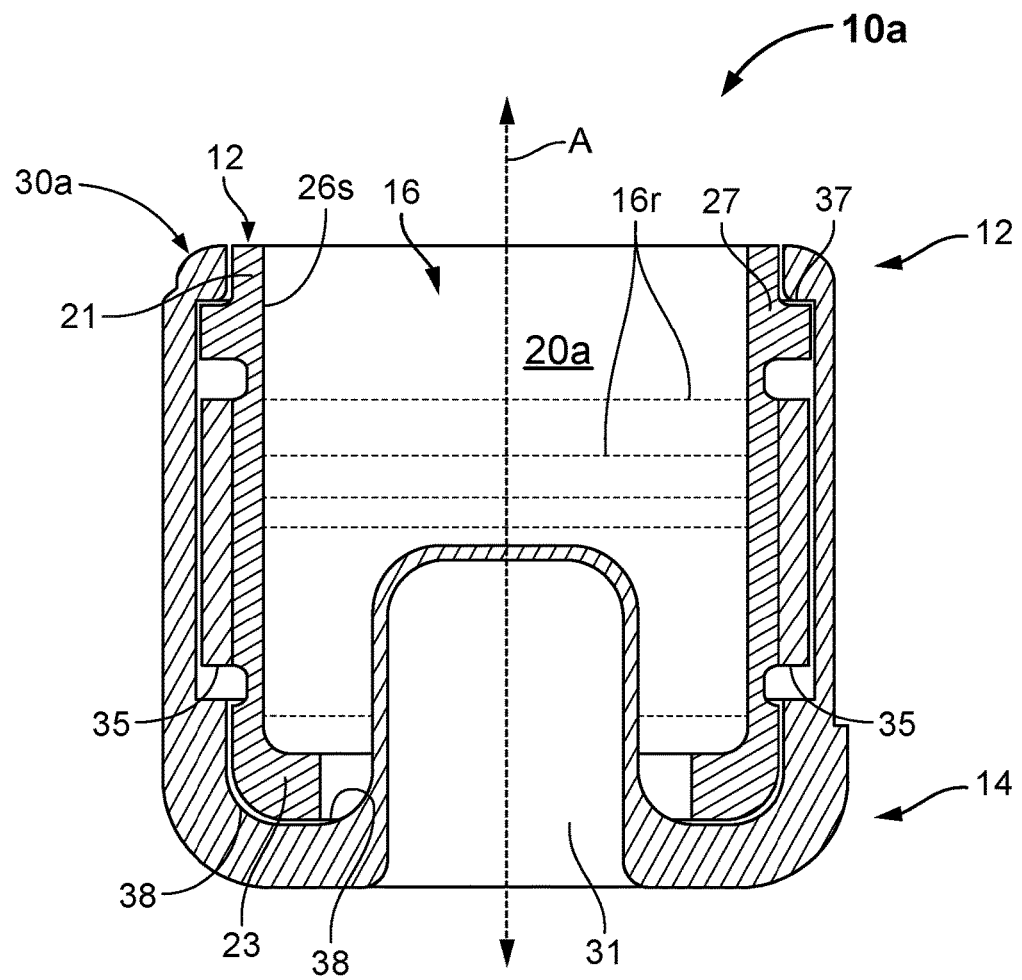
FIG. 20 is a sectioned side view of the thread protector of the embodiment of FIG. 11A taken along lines E-E of FIG. 11A.

When in the locked configuration L, the size, dimensions and inside diameter ID' of the opening 12o and interior 16 is reduced (as compared to the inside diameter ID when in the unlocked configuration) so as to securely grip the threaded end TR via a friction fit and securely mount the thread protector 10 to that threaded end TR (see FIGS. 10 and 12). As will now be clear to those skilled in the art, the inside diameter ID of the opening 12o and interior 16 changes in size as the thread protector 10 is moved or rotated R between the locked L and unlocked U configurations, with the inside diameter ID' of the locked configuration decreasing D and being smaller than the inside diameter ID of the unlocked configuration, and also being smaller than the outside diameter OD of the tubular member T.

To facilitate the thread protector 10 actuating between a locked L and an unlocked U configuration, thread protector 10 preferably further comprises an inner member 20 and an outer member 30, coaxially arranged around axis A (see FIGS. 2, 9, 11B, 20, and 21). Preferably inner member 20 and outer member 30 are each substantially hollow cylindrical members, or generally annular sleeve-like members, as illustrated in the Figures.

In various embodiments, outer member 30 (or 30a, 30b) generally comprises a cup or cap shaped structure having a first or bottom, open end 33 and a second, upper substantially closed end 34 oriented about axis A. Outer member bottom end 33 generally comprises an opening 33o (shown here to be, for example, substantially cylindrical) having an inner diameter 33id oriented about axis A. Outer member 30 further comprises an inner space 36 defined by inner surface 36s. Compression ramps 35 extend inwardly towards axis A from the inner surface 36a. The compression ramps 35 further comprise slopes 35a that are oriented in the same direction about the axis A.

In various embodiments, inner member 20 (or 20a, 20b) generally comprises a cylindrical structure orientated about axis A having a lower end 22, an upper end 25, an outer surface 20s, and an inner surface 26s (16s) defining an interior space 26 oriented about axis A. The inner member further comprises openings 22o and 23o at respective ends 22 and 24 forming part of interior space 26. Compression ramps 25 extend outwardly towards axis A from the outer member 20 outer surface 20s. The compression ramps 25 further comprise slopes that are oriented in the same direction about the axis A. Each ramp 25 has a ramp entrance, a ramp sloped section, and a ramp exit. During the locking step, the outer member 30 is rotated about axis A in a direction opposite to that of the inner member 20, such that the outer member ramp entrance engages with a corresponding inner member ramp entrance to begin compression of the inner member as the outer ramp rides up on the inner ramp.

Preferably inner member 20 and outer member 30 are made from a durable, non-corrosive and weather resistant material, such as polyurethane or rubber. More preferably, inner member 20 is flexible and bendable, so as to: (i) facilitate placement and/or removal of inner member 20 substantially into interior 36 of outer member 30 when assembling both members 20, 30 into a thread protector 10 (see FIGS. 5 and 6), (ii) flex around and grip a threaded end TR of a tubular member when in the locked configuration (see FIG. 10), and (iii) enable changing the inside diameter ID of the opening 12o and interior 16—i.e. with the inside diameter ID' of the locked configuration flexing and decreasing (in the direction as indicated by arrows D), thereby being smaller than the inside diameter ID of the unlocked configuration (see FIG. 12). Preferably, the outer member 30 has a urethane hardness that is greater than the urethane hardness of the inner member 20. For example, a durometer (duro) hardness of 60 or 70 for the inside member 20 and a durometer (duro) hardness of 90 for the outside member 30 has been found to be suitable.

Outer member 30 further comprises an inner surface 36s defining the inner space 36. Outer member 30 may also further comprise an indent 31 in its upper end 34 to permit, e.g., a user's thumb to enter the indent to further enhance the user's grip. In one embodiment, the indent 31 extends inwardly into the interior space 36 of outer member 30 forming an inner circumferential channel 38 in the inside upper end surface of the outer member 30. This channel 38 can receive the inner member top end lip 23, the lip 23 defining an opening 23o having an inner diameter 23id. In another embodiment, the inner member may further comprise one or more air openings 31a. Outer member 30 may also comprise a retaining groove or lip 37 on its lower end 33 for retaining a corresponding retaining shoulder 27 on the lower end 22 of inner member or 20. In one embodiment, retaining shoulder 27 comprises a raised shoulder about the entire circumference of the outer surface of inner member 20. In another embodiment, retaining shoulder may comprise one or more raised shoulder segments located about the circumference of the lower end of the inner member 20. In the embodiments illustrated, retaining shoulder 27 will snap into place under outer member lip 37 to secure the inner member 20 within the outer member 30 to permit rotation about axis A. In these embodiments, a cylindrical portion 21 of inner member 20 extends outward (toward end 22) in the axial A direction.

Inner member 20 and outer member 30, along with opening 12o and interior 16, are coaxially aligned around a common axis A, so as to allow the thread protector 10 to fit around a threaded end TR when this axis A is substantially aligned with the longitudinal axis LA of a tubular member T (see FIGS. 9 and 10).

Preferably, inner member 20 has a first, or bottom end 22 and second, or top end 24 and the outer member 20 has a first, or bottom end 33 and a second, or top end 34 both of which respectively substantially correspond, to first end 12 and second end 14 of thread protector 10, when inner member 20 and outer member 30 are in the assembled state. More preferably, inner member 20 also has opening 22o that substantially corresponds to opening 12o of the thread protector 10, and has an interior space 26 defined by interior surface 26s having a generally circular cross-section and an inside diameter 26id that substantially corresponds to interior 16 and inside diameter ID (26id) of the thread protector 10. That is, preferably, opening 22o and interior 26 of the inner member comprise the opening 12o and interior 16 of the thread protector 10. Inner member 20 may also comprise an upper end lip 23 which is insertable into the upper end 34 of the outer member 30.

Figure 29:
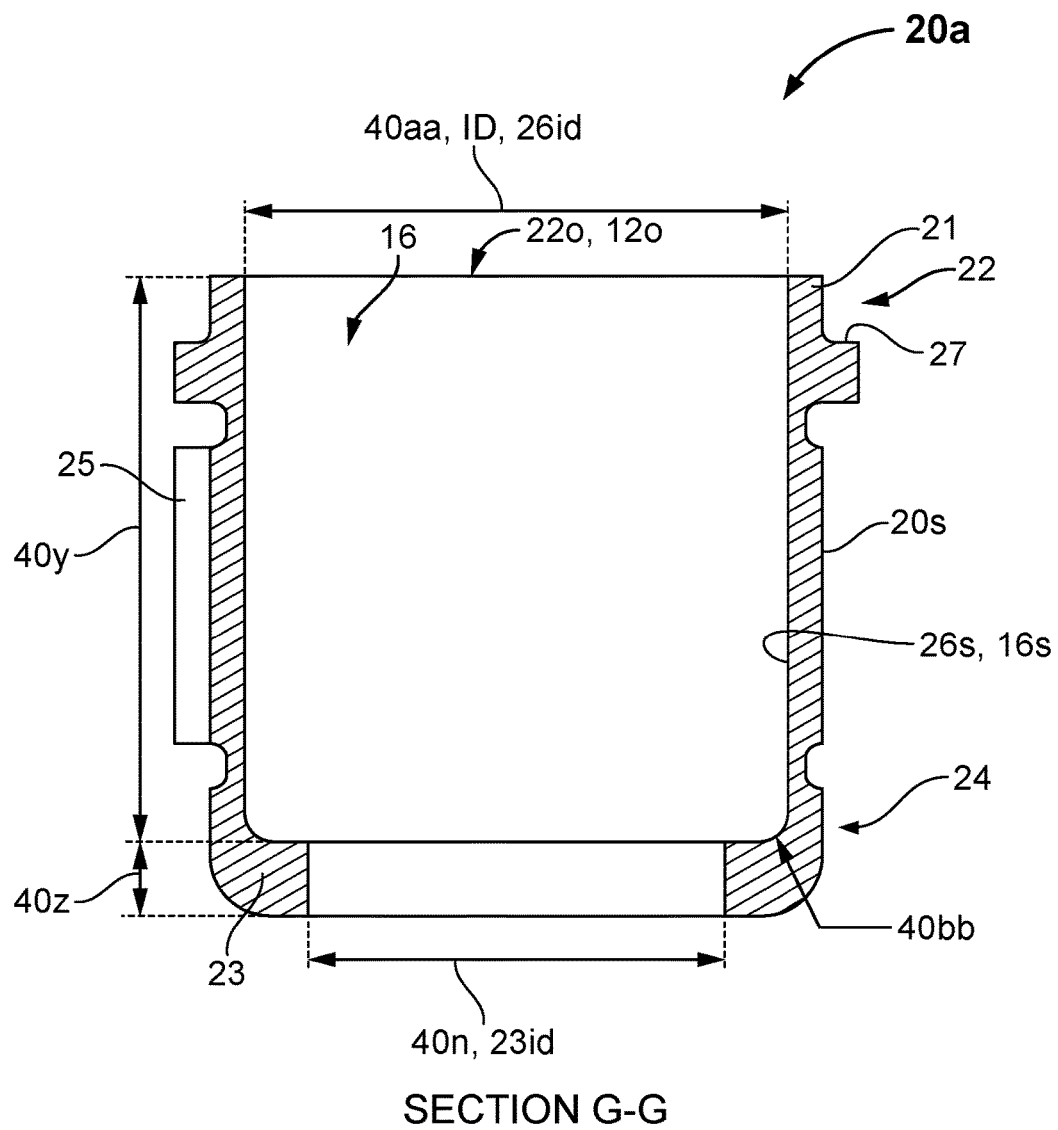
FIG. 29 is a sectioned view of the outer member of the embodiment of FIG. 26, taken along line G-G of FIG. 26 illustrating different camming engagement relationships between the inner and outer member lugs.
Figure 30:
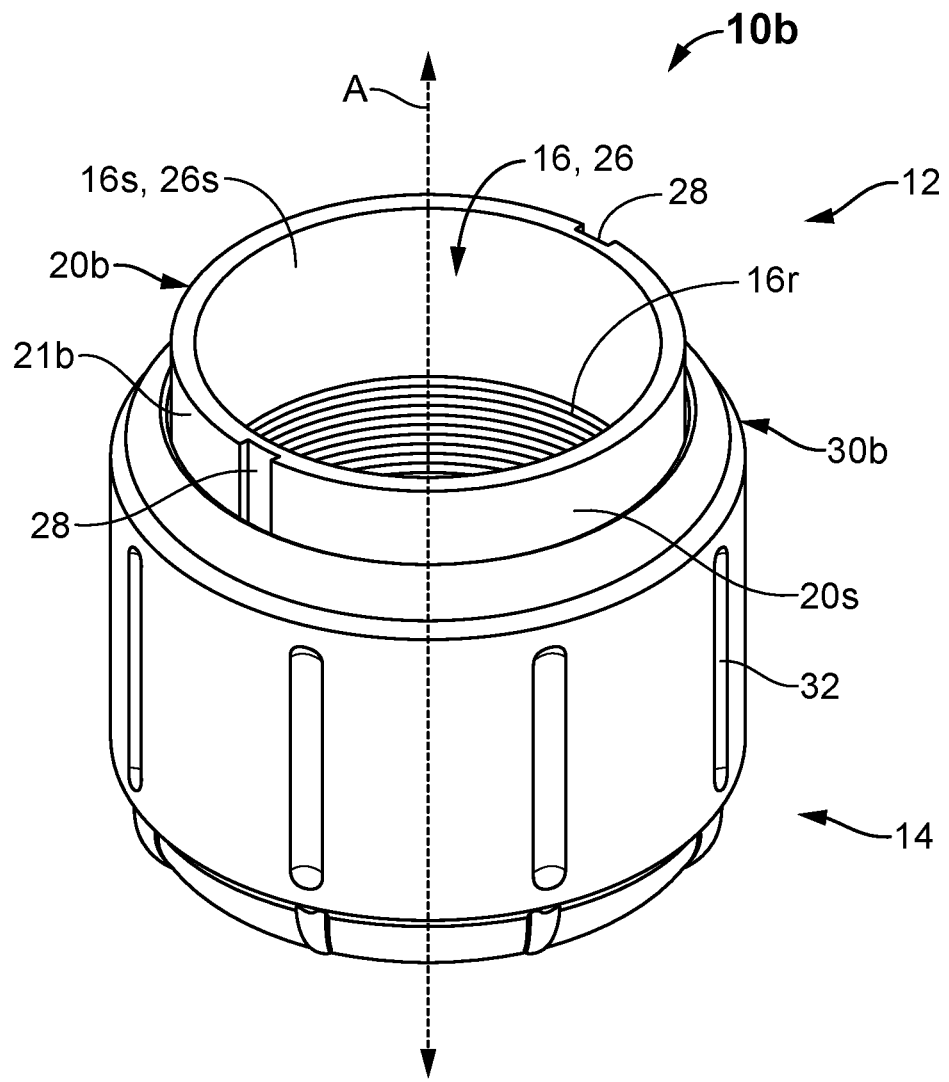
FIG. 30 is a bottom side perspective view of another thread protector embodiment of the present disclosure.
Figure 31:
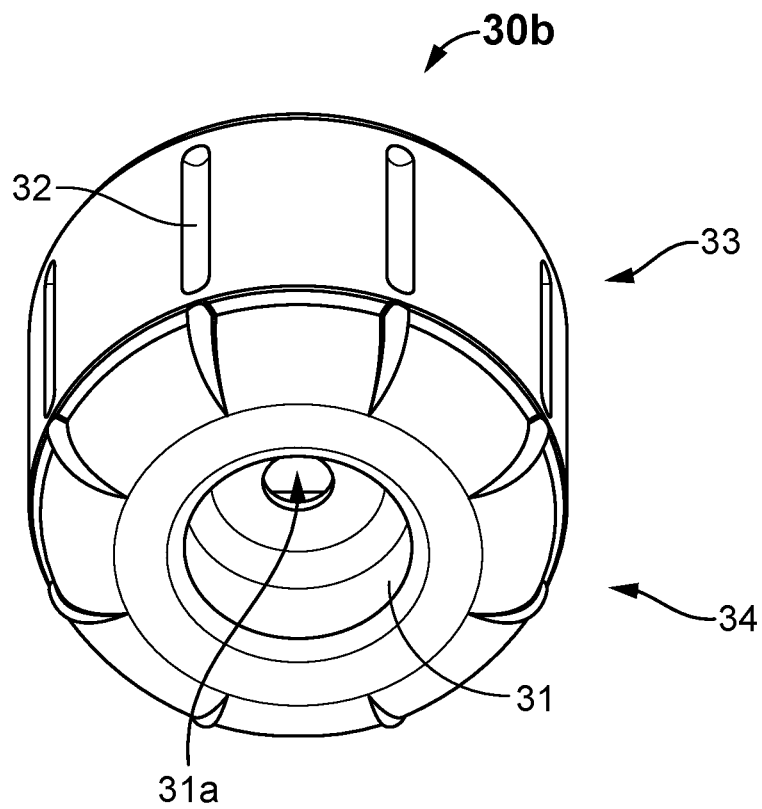
FIG. 31 is a top side perspective view of the outer member of the thread protector of FIG. 30.

A suitable inside diameter ID of the opening 12o, 22o, when in the unlocked configuration U, will generally only be a few millimeters larger (1 to 5 mm) than the outside diameter OD of the tubular member T. For example, referring to FIGS. 22-29, a thread protector 10 sized for a tubular member T having a 4.5 inch outer diameter OD may have an inside member 20 with an opening 22o sized at 4.563 inches; see FIG. 29, which shows an embodiment of inside member 20 having an inside diameter ID of 4.563 inches, this being 0.063 inches or 1.6 mm larger than an OD of 4.5 inches. For illustrative purposes, exemplary dimensions (in inches) for such embodiment may comprise the following callouts: 40a=R3.219; 40b=4.500; 40c=1.500; 40d=R1.00; 40e=0.500; 40f=0.938; 40g=1.362; 40h=1.138; 40i=0.312; 40j=1.175; 40k=0.575; 40l (33id)=ø5.250; 40m=R0.500; 40n (23id)=ø3.500; 40o=ø5.750; 40p=ø5.125; 40q=0.563; 40r=0.500; 40s=0.375; 40t=0.375; 40u=1.062; 40v=ø4.863; 40w=R0.125 TYP; 40x=2.400; 40y=4.750; 40z=0.625; 40aa (26id, ID)=ø4.563; and 40bb=R.2.00.

With the inner member 20 being made of a flexible material (such as polyurethane), and having an opening 12o,22o dimensioned to only be a few millimeters larger than the outside diameter OD of a tubular member T, the thread protector 10 is able to slide over a threaded end TR and slightly engage the end TR with a small friction fit. Preferably, interior ridges 16r are provided on the interior surface 16s of the inner member 20 within the interior 16 (see FIG. 1), the ridges 16r being configured to frictionally engage the threaded end TR and further maintain the inner member 20 frictionally engaged with the threaded end TR.

Figure 21:
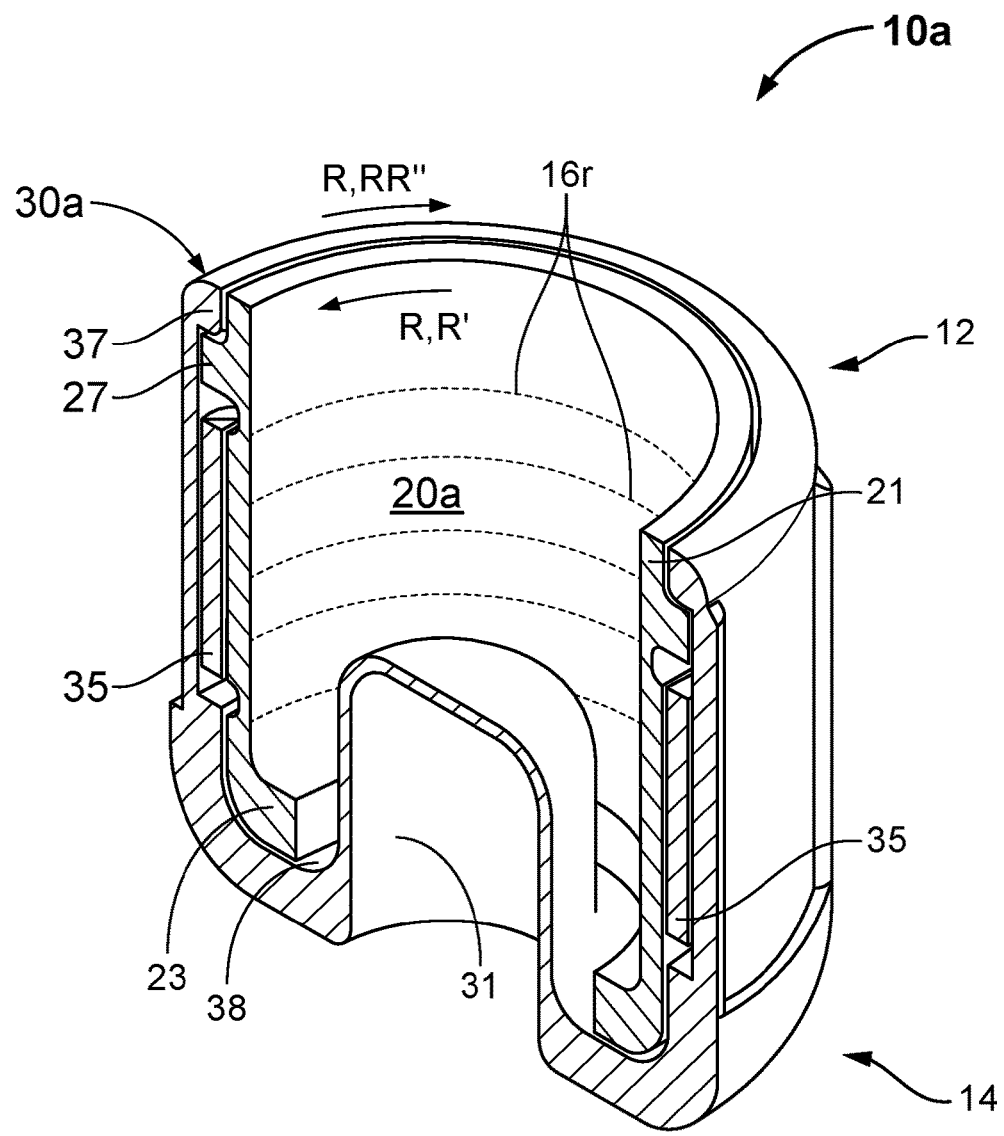
FIG. 21 is a sectioned perspective view of the thread protector of the embodiment of FIG. 11A showing the same sectional view as in FIG. 19.
Figure 22:
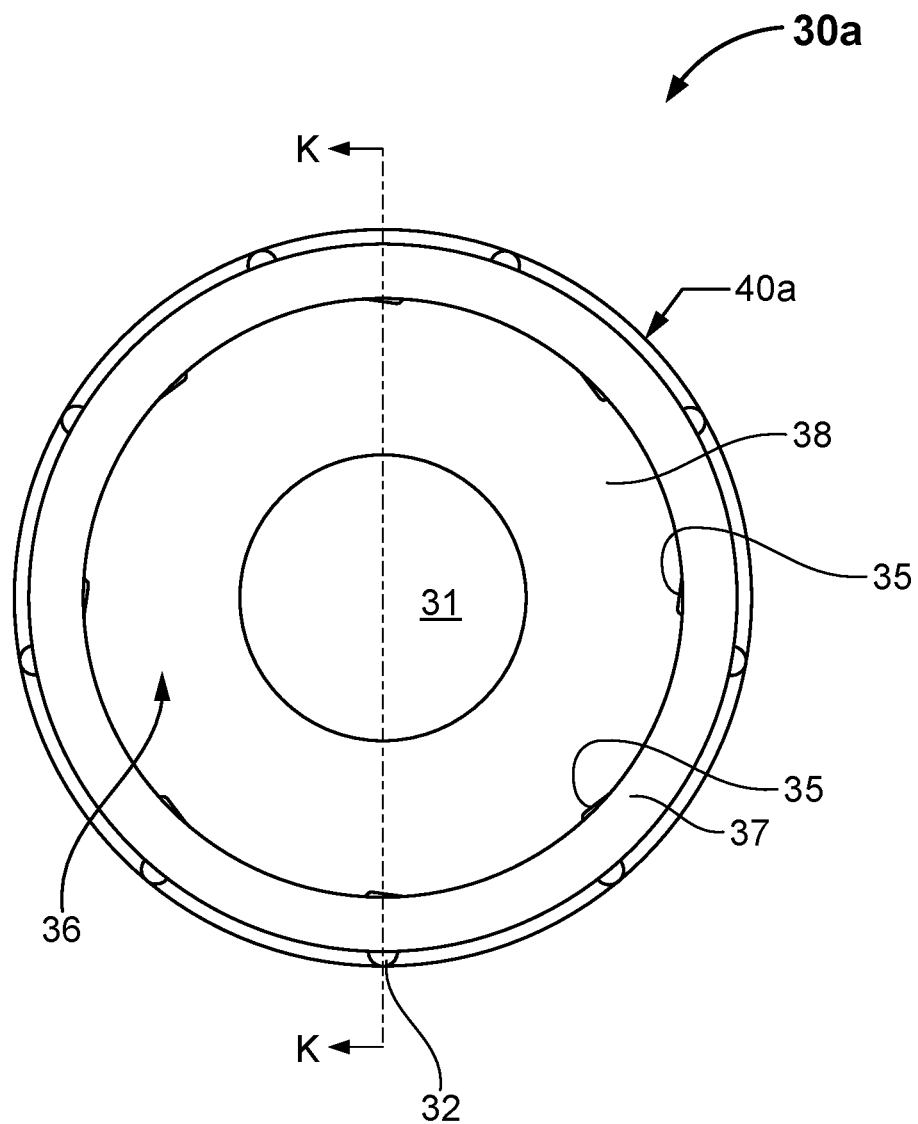
FIG. 22 is a bottom end view of an outer member of a third embodiment of the thread protector of the present invention, such as shown in FIGS. 11A-21, directed to an embodiment having preferred dimensions (in inches) suitable for placement of this embodiment onto a 4.5 inch outside diameter tubular member (not shown), FIGS. 22-29 being marked with callout lines for indicating such preferred example dimensions.
Figure 23:
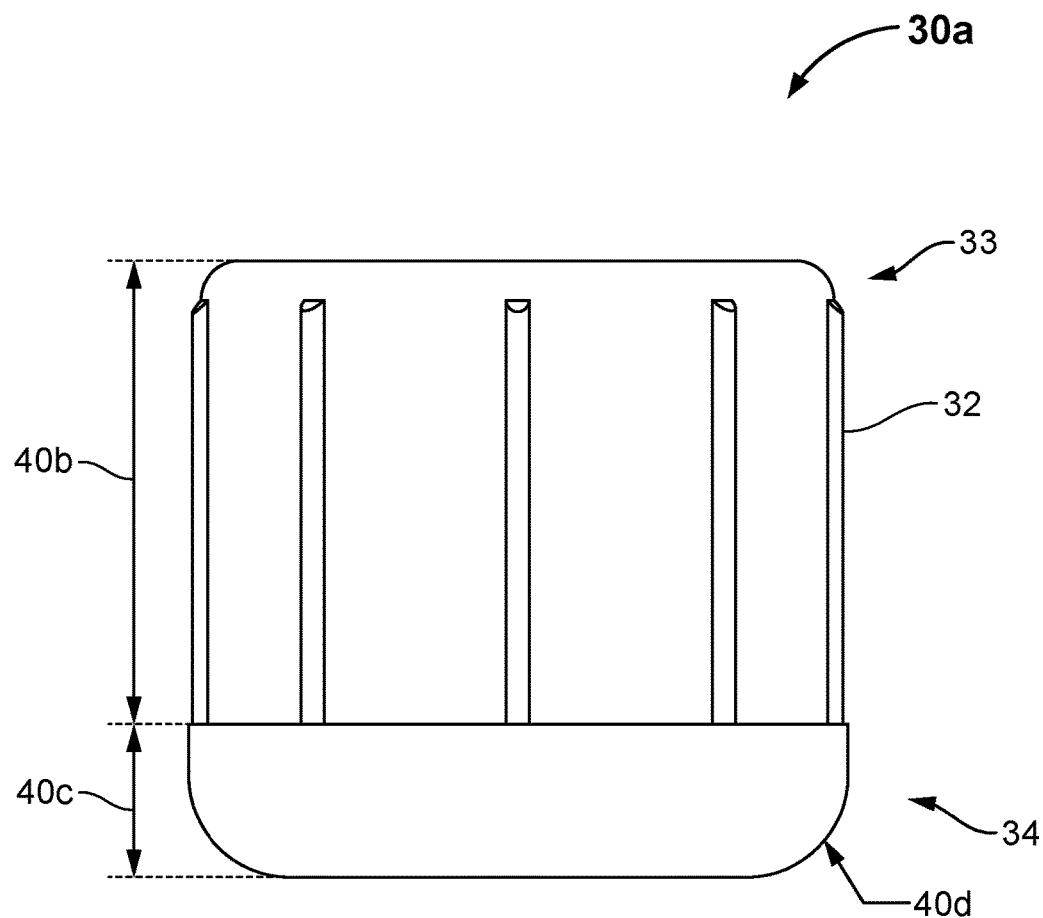
FIG. 23 is a side view of the outer member of the embodiment of FIG. 22.
Figure 24:
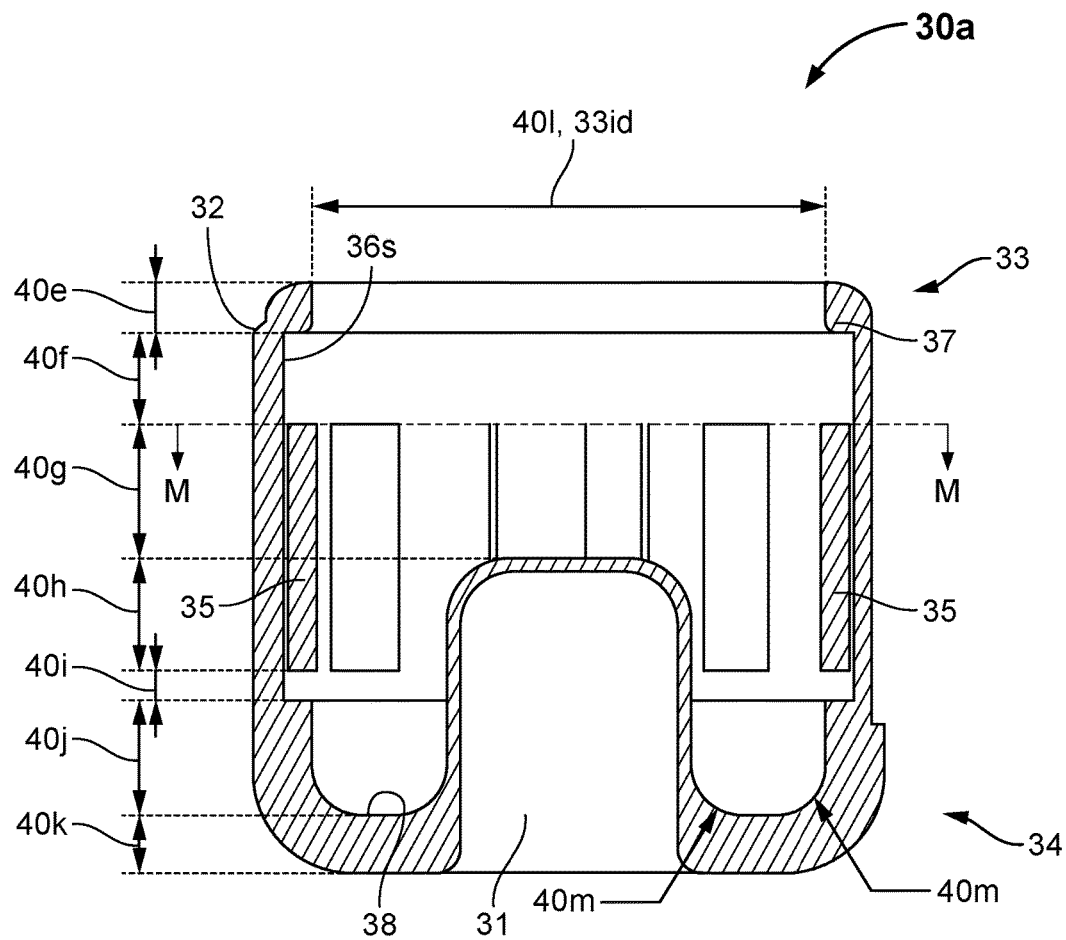
FIG. 24 is a sectioned view of the outer member of the embodiment of FIG. 22, taken along line K-K.
Figure 25:
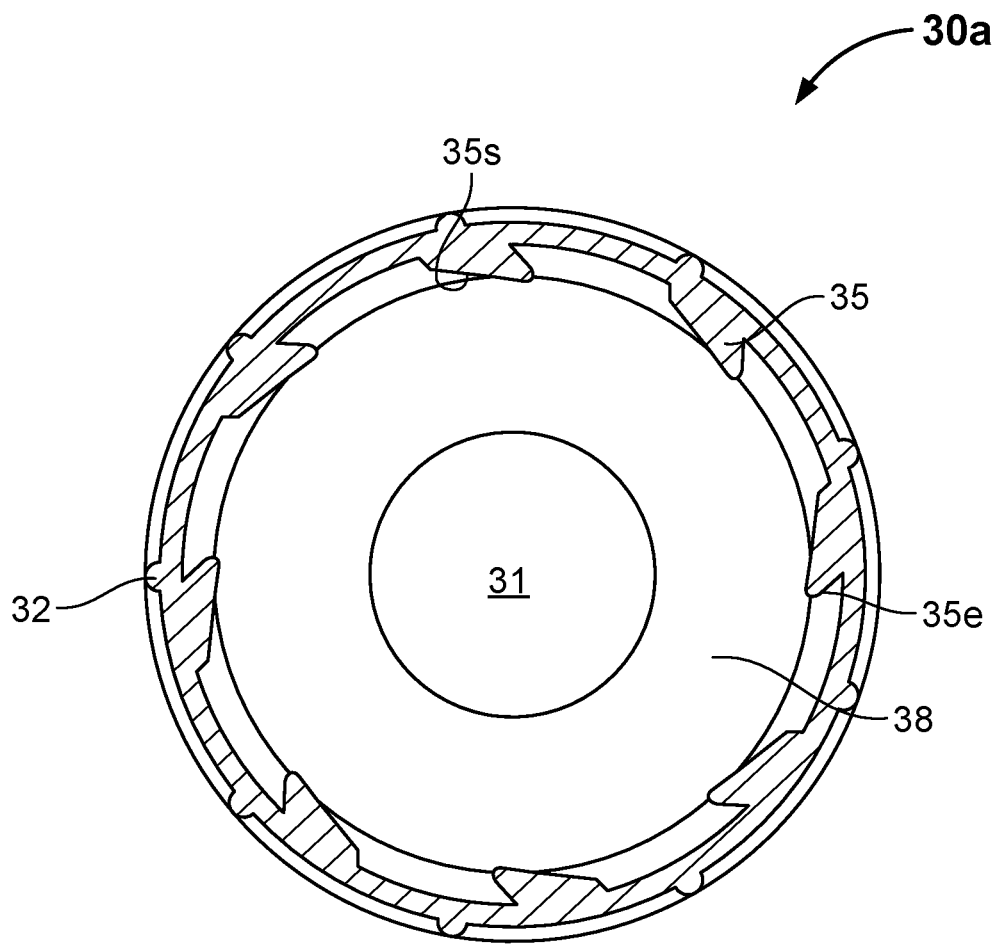
FIG. 25 is a sectioned view of the outer member of the embodiment of FIG. 22, taken along line M-M of FIG. 24.
Figure 26:
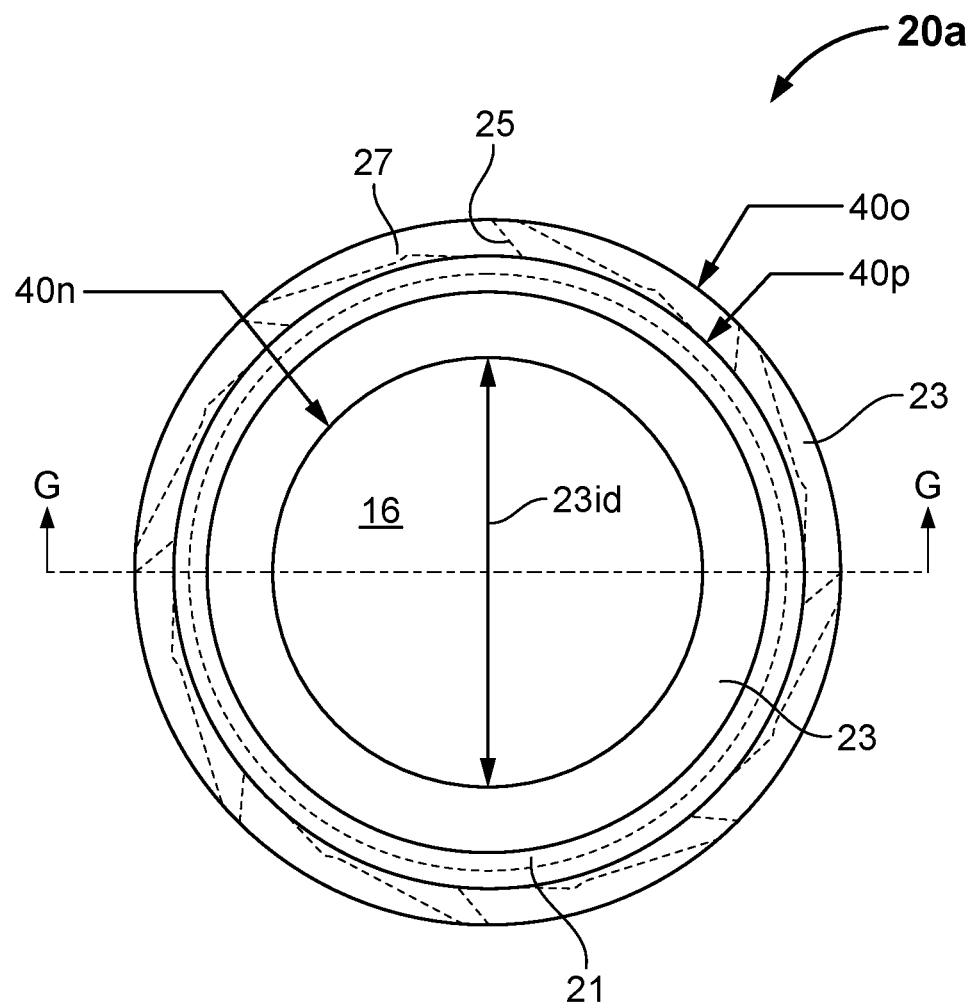
FIG. 26 is a bottom end view of an inner member of a third embodiment of the thread protector of the present invention (e.g., FIG. 13), marked with callout lines for preferred dimensions suitable for placement of this embodiment onto a 4.5 inch outside diameter tubular member (not shown)
Figure 27:
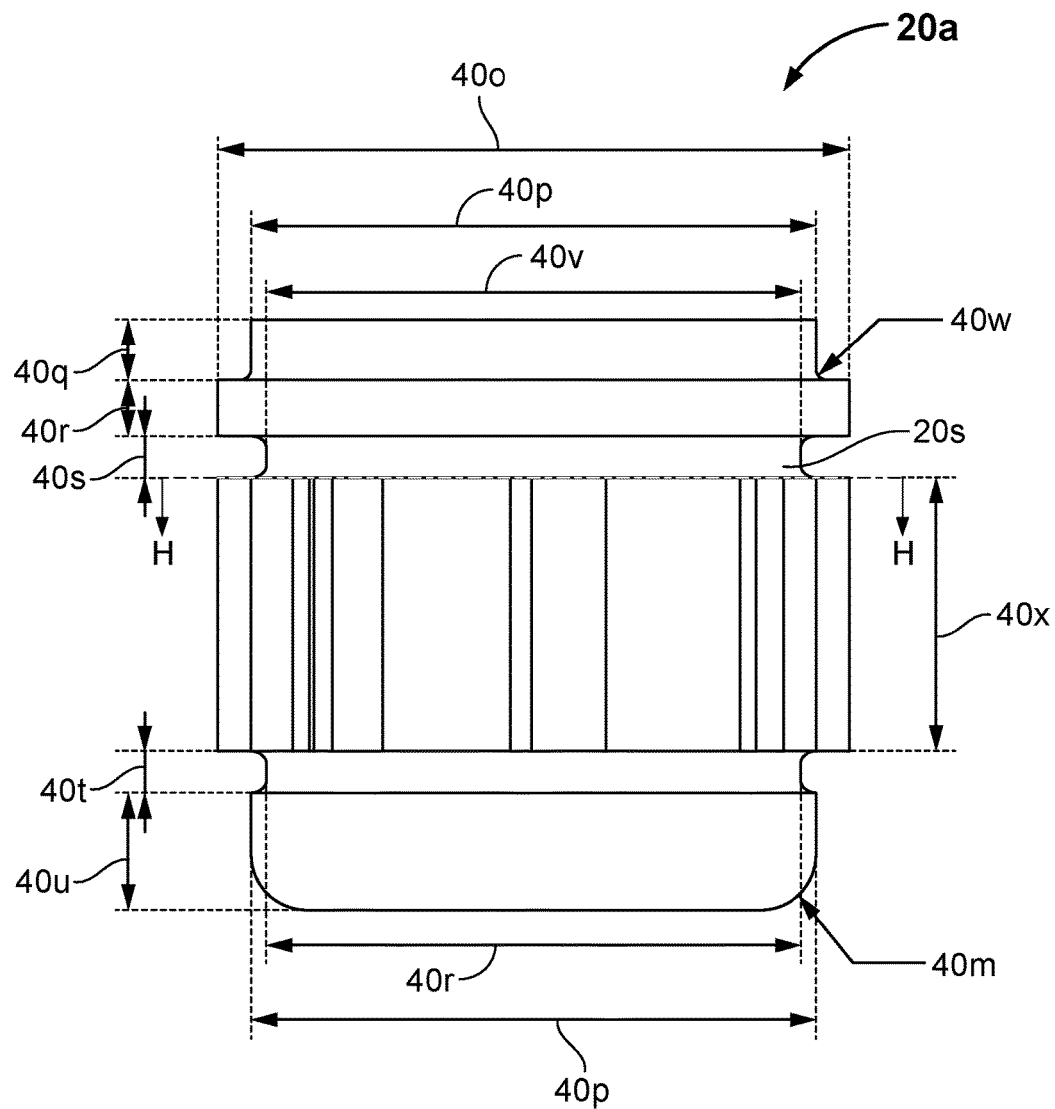
FIG. 27 is a side view of the inner member of the embodiment of FIG. 26.
Figure 28:
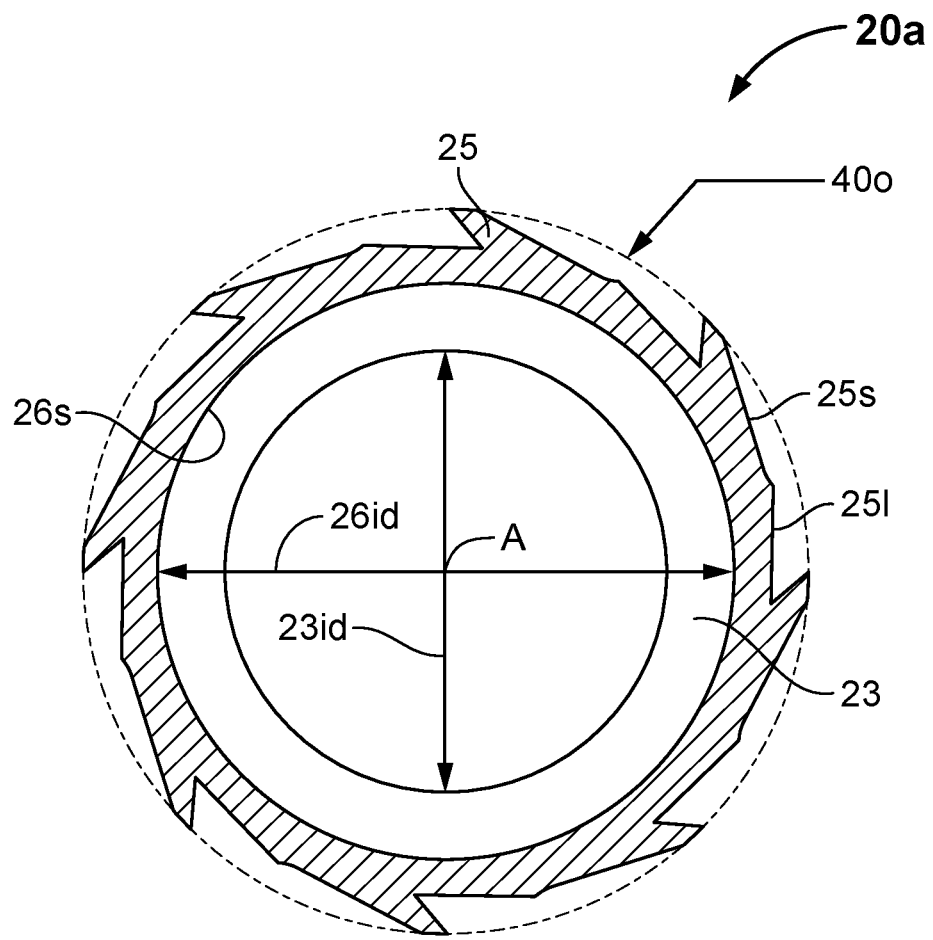
FIG. 28 is a sectioned view of the outer member of the embodiment of FIG. 27, taken along line H-H of FIG. 27.

Inner and outer members 20, 30 are suitable to rotate R relative to each other, at least partially about axis A, with inner member rotating in one direction R' and the outer member rotating in the opposite direction R" (see FIGS. 11, 12 and 21). Preferably, a grease or other lubricant is provided between inner member 20 and outer member 30 to reduce any friction therebetween and facilitate easy rotation R of each member relative to the other. A white, nonstaining, lithium, marine grease has been found to be suitable when the inner and outer members 20, 30 are comprised of polyurethane. Grips 32 are preferably provided on the outside surface of the outer member 30 to facilitate a user or operator to manipulate the thread protector 10 and to rotate outer member 30 relative to the inner member, so as to actuate the thread protector 10 between the locked L and unlocked U configurations as desired. Grips 32 can be formed from a variety of configurations known in the art, including, for example and without limitation, a series of concave grooves within the surface or a series of raised ridges, or other suitable gripping configurations.

Inner member 20 further comprises a plurality of external lugs 25, and outer member 30 further comprises a plurality of internal lugs 35. Each set of lugs 25, 35 preferably comprises generally opposite oriented slopes 25s, 25s, to allow lugs 25 and 35 to engage each other and decrease/deflect D the inner member 20 so as to reduce that members inside diameter ID', when the members are rotated R', R" relative to each other from the unlocked configuration to the locked configuration (see FIGS. 11 and 12). Preferably, the plurality of lugs 25, 35 are provided in a substantially evenly spaced circumferential arrangement around the inner member's outside surface and around the outer member's inside surface (as generally shown in the Figures). In one embodiment, inner member external lugs 25 have a further built up camming surface or ramp 25a to create greater compression against one or more of the engaging outer member internal lugs 35.

More preferably the lugs 25, 35 are shaped and dimensioned so as to provide zero deflection D of the inner member 20 when in the unlocked configuration (see FIG. 11) and maximal deflection D when in the locked configuration (see FIG. 12).

A suitable amount of deflection D is substantially around ¼ inch, with each individual lug, in each cooperating, paired and engaged set of lugs 25, 35, providing ⅛th of an inch of deflection (i.e. each lug projects from each member's surface by substantially around ⅛th of an inch). A suitable amount of paired sets of lugs 25, 35, for a 4.5 inch outside diameter tubular member is eight paired sets, positioned evenly around each member's surface (as shown in the Figures). A greater, or smaller, set of paired lugs may be suitable for larger and smaller sized thread protectors.

As will now be clear to those skilled in the art, cooperating sets of sloped lugs 25 and 35, along with rotation R of the inner member 20 relative to the outer member 30, along axis A, actuates the thread protector 10 between the unlocked and locked configurations. A snug and slidable fit of the inner member 20 over a threaded end TR has been found to generally keep the inner member 20 frictionally engaged to the threaded end TR, and reduce or prevent any rotation of the inner member 20. A user may then apply a rotating force R" to the outside member 30 (e.g. via grips 32), thereby causing the inner and outer members 20, 30 to rotate relative to each other.

More preferably, one of the sets of lugs (e.g. the lugs 25 on the inner member 20), may further comprise a lock indicator ridge or groove (or leading edge) 25l to catch a free end of an opposing lug (e.g. 35e) when members 20 and 30 are fully rotated into the locked configuration. Engagement of the free end 35e with the lock indicator 25l will provide tactile and auditory feedback (e.g. a 'click') to a user that the thread protector is fully in the locked configuration.

As illustrated in the figures, each row of ramps/lugs 35, 25 may be aligned in columns about the respective member surfaces in corresponding fashion to permit interaction between each lug 35 and corresponding lug 25 (as shown), however, other configurations are possible, such as by staggering each row of lugs 35 and corresponding row of lugs 25 (not shown).

Referring now to FIGS. 30-34, there is illustrated another embodiment of the thread protector 10b. This embodiment may be used with varying tubular member outer diameters, including those with larger O.D. The basic structure and operation of this embodiment is similar to that of the embodiments described above for thread protectors 10 and 10a except that the interface between the inner member 20b and outer member 30b differs. In this embodiment, like in the prior embodiments, the inner member 20b is coaxially mountable within the outer member 30b to permit rotation, or partial rotation, about axis A of the outer member relative to the inner member to permit moving the thread protector between a locked position L and an unlocked position U. Like with prior embodiments, the locking mechanism comprises one or more inner lugs or pressure ramps 135 protruding inwardly toward axis A on the inner surface 36s of the outer member 30b and capable of camming up against corresponding one or more outer lugs or pressure ramps 125 on the outer surface of the inner member to place an inward force on the inner member in a substantially radially inward direction toward the axis A to enhance the interface between the inner surface of the inner member place inward force on the inner member.

In this embodiment, one or more circumferential rows of pressure ramps 135 are spaced about axis A on the inner surface 36a of outer member 30b. These outer member pressure ramps 135 generally comprise a ramp entrance 135a, a sloped ramp section 135s increasingly sloping inwardly toward the axis A, and a ramp exit 135b. Similarly, one or more circumferential rows of pressure ramps 125 are disposed in spaced-apart relationship on the outer surface 20s of inner member 20b. These inner member pressure ramps 125 generally comprise a ramp entrance 125a, a sloped ramp section 125s increasingly sloping outwardly away from the axis A (e.g., in a radiused fashion), an optional linear sloped section 125ss and a ramp exit 125b. When the internal member 20b is installed within the outer member 30b, these arrays of pressure ramps 135, 125 interact with each other upon rotation about axis A of the outer member 30b relative to the inner member 20b as described above.

Figure 32:
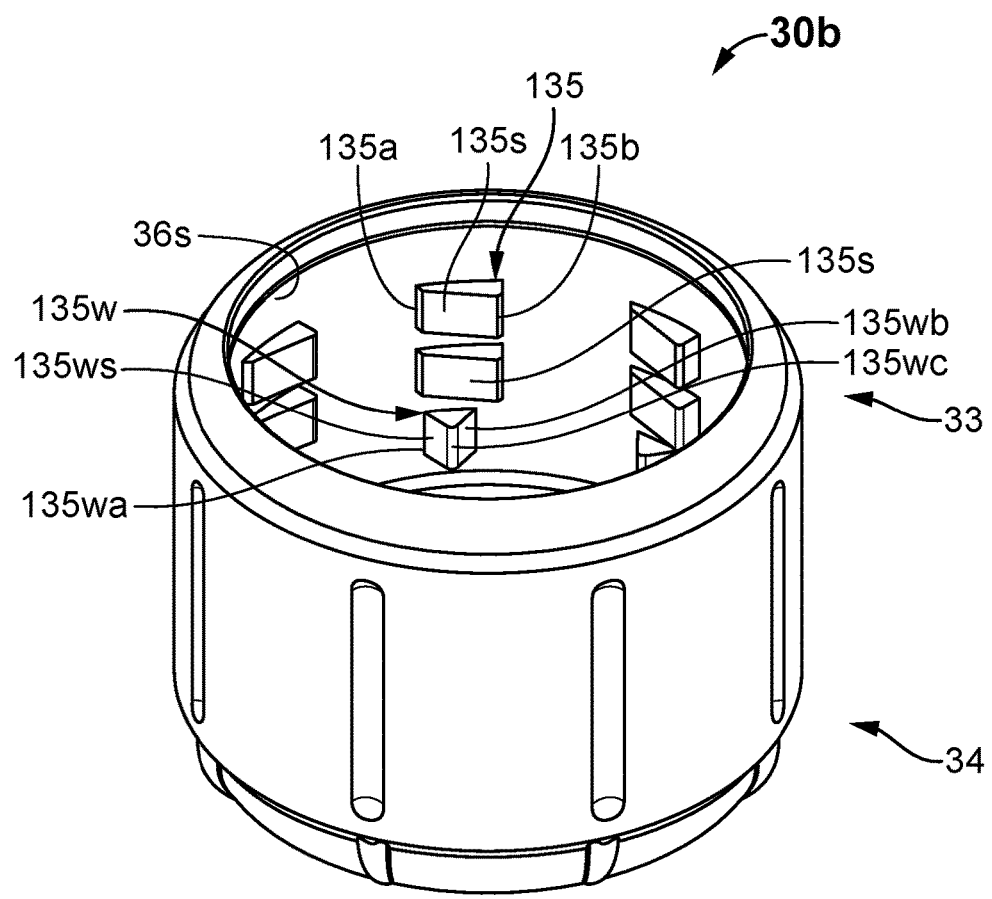
FIG. 32 is a bottom side perspective view of the outer member of the thread protector of FIG. 30.
Figure 33:
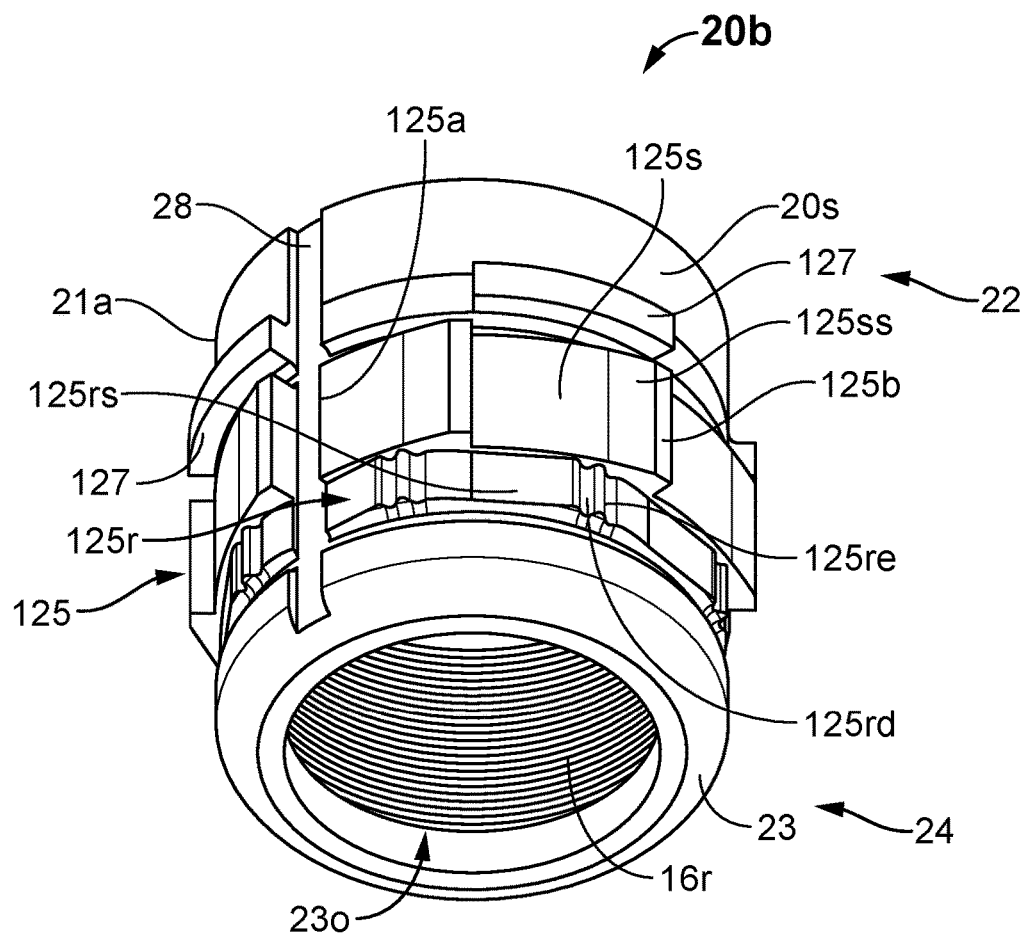
FIG. 33 is a top side perspective view of the inner member of the thread protector of FIG. 30.
Figure 34:
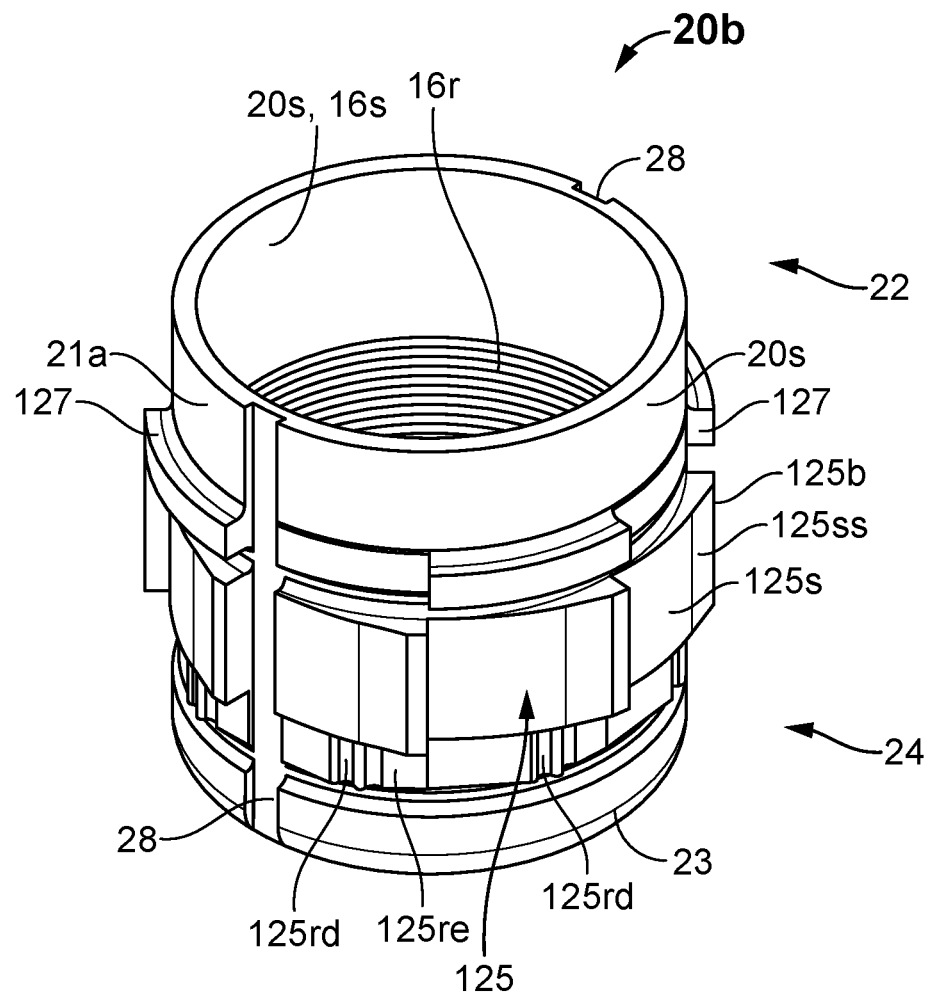
FIG. 34 is a bottom side perspective view of the inner member of the thread protector of FIG. 30.

In this embodiment, an additional one or more circumferentially disposed rows of locking wedges 135w may be spaced apart about the axis A on the outer member 30b inner surface 36s. Each outer member locking wedge 135w comprises wedge ramp entrance 135wa, wedge sloped section 135ws wedge apex 135wc, and wedge ramp exit 135wb. In one embodiment, the outer member comprises two rows of spaced apart pressure ramps 135 and one row of spaced apart locking wedges 135w as generally depicted in FIG. 32. As illustrated in FIG. 32, each row of ramps 135 and wedges 135w may be aligned in columns about the inner surface 36s (as shown), however, other configurations are possible, such as by staggering each row (not shown). The inner member 20b outer surface 20s further comprises one or more circumferentially disposed locking wedge receiving ramps 125r for engaging with the corresponding locking wedges 135w on the outer member 20b. Each locking wedge receiving ramp 125r comprises an entry onto a sloped section 125rs, where the slope increases outwardly away from the axis A, one or more detents or valleys 125rd proximate the end of the sloped section 125rs, and the ramp exit 125re. As the corresponding inner member outer lugs 125 and outer member inner lugs 135 ride up on each other upon opposed rotation about axis A in the locking direction L, the locking wedge 135w (particularly its apex 135wc) rides up the corresponding locking ramp receiving slope 125s, and the inner member inner surface 16s is compressed against the threaded end TR of the tubular member T (not shown). As may be desired, further rotation in the locking direction L will urge the locking ramp apex 135wc to engage with the corresponding locking wedge receiving ramp detent to assist in holding the thread protector 10b in its locked position against the threaded end TR of the tubular member T.

In this embodiment, the inner member 20b may further comprise one or more channels 28 in its outer surface 20s to enhance the flexibility and compressibility of the inner member 20b. In this embodiment, the channels or grooves 28 are oriented vertically in the axial A direction.

Furthermore, in this embodiment, the inner member top end lip or retaining shoulder 127 is similar to shoulder 27 in earlier figures, except that here it comprises one or more circumferentially spaced apart shoulder segments. Additionally, in this embodiment, the inner member 20b may have a portion 21b of its cylindrical structure extending outward (toward end 12) in the axial A direction beyond the lower end 33 of the outer member 30b to accommodate longer threads.

The present invention is also directed to a method of protecting the threaded ends of tubular members by inserting any of the thread protectors (suitable sized) over the threaded and, and then rotating the outer member relative to the inner member to urge the camming members to compress the inner member inner surface against the outer surface of the threaded member.

Those of ordinary skill in the art will appreciate that various modifications to the invention as described herein will be possible without falling outside the scope of the invention. In the claims, the word "comprising" is used in its inclusive sense and does not exclude other elements being present. The indefinite article "a" before a claim feature does not exclude more than one of the features being present.

For example and without limitation, in the disclosed embodiments, the outer member is generally depicted as a cap-shaped structure capable of receiving an inner member having a substantially cylindrical section, where the inner member is capable of being placed over a threaded end of a tubular member and compressed against the threads by way of a camming action between the inner face of the outer member and the outer face of the inner member. However, in an alternative embodiment, the inner member could be a substantially cap like structure insertable over the threaded end of a tubular member, and further comprise a ring-like or sleeve-like outer member coaxially overlaying the outer cylindrical surface of the inner member. In this embodiment, the inner member would contain similar outwardly extending lugs on its outer surface, and the outer member/sleeve would contain corresponding inwardly extending lugs on its inner surface, such that upon rotation of the outer ring/sleeve about the axis in a direction opposite the inner member, the outer member lugs would press against the corresponding inner member lugs to exert compression of the inner surface of the inner member against the threaded end of the tubular member.

Additionally, although the inner member is generally depicted as being a substantially cylindrical structure having opposed open ends, it could be fabricated where the upper end is closed and nests within the upper inside end of the outer member. In this embodiment, if desired, air holes could be provided through the upper ends of the inner and outer members. Also, while the lugs have generally been described as comprising a ramp style surface, other camming surfaces could be employed. Further, exemplary structure has been described for retaining the inner member within outer member, e.g., by retaining shoulders, however, it will be understood by those having the benefit of this disclosure that other suitable mechanisms exist to coaxially retain the inner member within the outer member.

While the invention has been described in terms of preferred embodiments, it will be apparent to those of skill in the art that variations may be applied to the process and system described herein without departing from the concept and scope of the invention. All such similar substitutes and modifications apparent to those skilled in the art are deemed to be within the scope and concept of the invention. Those skilled in the art will recognize that the method and apparatus of the present invention has many applications, and that the present invention is not limited to the representative examples disclosed herein. Moreover, the scope of the present invention covers conventionally known variations and modifications to the system components described herein, as would be known by those skilled in the art. While the apparatus and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

I claim:

1. A thread protector for protecting the outside threaded end of a tubular member comprising:
   a. an outer member capable of rotating in a first direction about an axis comprising
      i. a first housing having a substantially closed top end, an open bottom end, an outer side wall structure extending about the axis between the top end and the bottom end, an outer surface defined by a side wall surface and an outer top end surface, an inner side wall surface, an inner top end surface, and an interior space defined by the open bottom end, the inner side wall surface and the inner top end surface;
      ii. one or more outer member lugs disposed on the inner side wall surface of the outer member, each lug having an outer member lug entrance oriented in the first direction of rotation, an outer member lug slope, and an outer member lug slope exit opposite the lug entrance, the slope generally increasing between the lug entrance and the lug exit;
      iii. one or more outer member retaining shoulders axially disposed about a circumference of the inner side wall surface and extending inwardly toward the axis; and
   b. an inner member coaxially nested within the outer member and capable of rotating in a second direction opposite the first direction about the axis comprising
      i. a second housing having a substantially annular wall structure disposed about the axis having top and bottom opposed open ends, a flexible outer annular wall surface, an inner annular wall surface of a desired inner diameter capable of receiving the tubular member threaded end, and an inner member inner space defined by the opposed open ends and the inner wall surface, ii. one or more inner member lugs disposed on the outer wall surface of the inner member, each inner member lug having an inner member lug leading edge oriented in the second direction of rotation, an inner member lug slope, and an inner member lug slope exit opposite the lug leading edge, the slope generally increasing between the lug leading edge and the inner member lug slope exit;

iii. one or more inner retaining shoulders axially disposed about a circumference of the inner member outer surface for interfacing with the one or more outer member retaining shoulders to retain the nested rotatable inner member within the outer member, wherein the inner member lugs and outer member lugs are disposed on their respective inner member outer surface or outer member inner surface so that when the inner member is nested within the outer member and the outer member is rotated in its first direction relative to the inner member or the inner member is rotated in its second direction relative to the outer member, one or more of the respective one or more outer lugs will engage with a corresponding one or more of the respective one or more inner lugs to urge the outer annular wall structure of the inner member to be compressed toward the axis thereby radially inwardly compressing the inner annular wall surface of the inner member towards the axis to engage with the tubular member threaded end when such threaded end is received within the inner member inner annular space.

2. The thread protector of claim 1 further comprising an indent in the outer top surface extending inwardly about the axis into the interior space of the outer member, and into the inner space of the nested inner member.

3. The thread protector of claim 2 further comprising one or more air holes in the indent.

4. The thread protector of claim 1 further comprising one or more grips on the outer surface.

5. The thread protector of claim 1 wherein the one or more retaining shoulders comprises a single shoulder extending about a portion of the circumference.

6. The thread protector of claim 1 wherein the one or more retaining shoulders comprises a single shoulder extending about the entirety of the circumference.

7. The thread protector of claim 1 wherein the one or more retaining shoulders comprise a plurality of shoulder segments spaced-apart about the circumference.

8. The thread protector of claim 1 wherein the outer member further comprises one or more locking wedges protruding inwardly from the inner side wall surface of the outer member, each of the one or more locking wedges comprising a wedge ramp entrance oriented in the first direction of rotation, a wedge sloped section, a wedge apex, and a wedge ramp exit; and wherein the inner member further comprises one or more corresponding locking wedge receiving ramps protruding outwardly from the outer annular wall surface of the inner member for engaging with a corresponding locking wedge, each of the one or more locking wedge receiving ramps comprising an entrance oriented in the second direction of rotation, one or more detents for receiving one or more of the corresponding wedge apexes, and a receiving ramp exit.

9. The thread protector of claim 1 wherein the one or more inner member lugs are evenly spaced apart about the circumference of the inner side wall surface of the outer member in one or more rows, and wherein the one or more outer member lugs are correspondingly evenly spaced apart on the outer wall surface of the inner member.

10. The thread protector of claim 1 wherein the one or more inner member lugs comprise a plurality of evenly spaced-apart inner member lugs disposed about the circumference of the inner member outer annular wall surface, and wherein the one or more outer member lugs comprise a plurality of evenly spaced-apart outer member lugs correspondingly disposed about the circumference of the outer member inner side wall surface.

11. The thread protector of claim 10 wherein the inner member lugs are spaced apart in a single circumferential row on the inner member outer annular wall surface, and wherein the outer member lugs are correspondingly spaced apart in a single circumferential row on the outer member inner side wall surface.

12. The thread protector of claim 10 wherein the inner member lugs are spaced apart in one or more single circumferential rows on the inner member outer annular wall surface, and wherein the outer member lugs are correspondingly spaced apart in one or more circumferential rows on the outer member inner side wall surface.

13. The thread protector of claim 1 wherein the inner member lugs further comprise a recessed area on the lug slope for receiving a corresponding outer member lug.

14. The thread protector of claim 1 wherein the outer member side wall surface forms a generally cylindrical structure and wherein the inner member inner annular surface forms a generally cylindrical structure having the desired inner diameter.

15. The thread protector of claim 1 wherein the inside annular wall surface contains surface gripping ridges for frictional engagement with the tubular member threaded end.

16. The thread protector of claim 1 wherein the flexible outer annular wall surface generally comprises a uniform wall thickness.

17. The thread protector of claim 16 wherein the flexible outer annular wall surface generally comprises a nonuniform wall thickness.

18. The thread protector of claim 17 wherein the flexible outer annular wall surface contains one or more channels to create zones of thinner wall thickness to increase the flexibility of the annular wall surface.

19. A thread protector having first and second ends for protecting the threaded end of a tubular member comprising:
  a. an outer member capable of rotating in a first direction about an axis comprising
    i. a substantially annular member disposed about the axis having first and second outer member ends, an outer member outer surface, and an outer member inner surface defining an outer member internal annular space, and
    ii. one or more raised camming members disposed about the axis on the outer member inner surface
  b. an inner annular flexible sleeve coaxially and rotationally nested within the outer member annular member and capable of rotating in a second direction opposite the first direction about the axis comprising
    i. an outer sleeve surface, an inner sleeve surface and opposed first and second sleeve end openings defining a sleeve inner annular space of a desired internal diameter capable of receiving a tubular member threaded end of a desired diameter, ii. one or more sleeve raised camming members disposed about the axis on the sleeve outer sleeve surface, c. an end cap capable of covering one end of the coaxially nested inner sleeve and outer member, wherein the raised sleeve camming members and the raised outer member camming members are disposed on their respective sleeve outer surface or outer member inner surface so that when the inner sleeve is nested within the outer member and the outer member is rotated in its first direction relative to the inner sleeve or the inner sleeve is rotated in its second direction relative to the outer member, one or more of the respective one or more outer member camming members will engage with a corresponding one or more of the respective one or more sleeve camming members to urge the sleeve outer surface to be compressed toward the axis thereby radially inwardly compressing the sleeve inner surface inwardly toward the axis to engage with the tubular member threaded end when such threaded end has been received within the sleeve inner annular space.

* * * * *